US012641013B2

(12) United States Patent
Rajagopalan et al.

(10) Patent No.: US 12,641,013 B2
(45) Date of Patent: May 26, 2026

(54) PATH SELECTION FOR MULTI-PATH CONNECTIONS IN A REMOTE COMPUTING ENVIRONMENT

(71) Applicant: Citrix Systems, Inc., Fort Lauderdale, FL (US)

(72) Inventors: Sridharan Rajagopalan, Ft. Lauderdale, FL (US); Rakesh Jha, Santa Clara, CA (US); Daniel Wing, Truckee, CA (US)

( * ) Notice: Subject to any disclaimer, the term of this patent is extended or adjusted under 35 U.S.C. 154(b) by 181 days.

(21) Appl. No.: 17/936,007

(22) Filed: Sep. 28, 2022

(65) Prior Publication Data

US 2024/0106739 A1    Mar. 28, 2024

(51) Int. Cl.
*H04L 45/302* (2022.01)
*H04L 45/12* (2022.01)

(52) U.S. Cl.
CPC ............ *H04L 45/306* (2013.01); *H04L 45/12* (2013.01)

(58) Field of Classification Search
CPC .............................. H04L 45/306; H04L 45/12
USPC ........................................................ 370/389
See application file for complete search history.

(56) References Cited

U.S. PATENT DOCUMENTS

| | | | |
|---|---|---|---|
| 2020/0367155 A1* | 11/2020 | Kanugovi ............. | H04W 48/18 |
| 2020/0382605 A1* | 12/2020 | Ouyang ................ | H04W 40/20 |
| 2023/0080537 A1* | 3/2023 | Ramanathan ....... | H04L 47/2475 709/238 |

OTHER PUBLICATIONS

J. Zhu et al., MPTCP Working Group (Draft), Initial-Path Selection for Connection Establishment in Multipath TCP, Feb. 22, 2019, 17 pages.

* cited by examiner

*Primary Examiner* — Asad M Nawaz
*Assistant Examiner* — Hugh Mark Ashley

(57) ABSTRACT

Methods and systems for performing one or more path selection processes that determine connection conditions and send the data via established, multi-path, connections are described herein. The one or more path selection processes may be performed in a remote computing environment where the established, multi-path, connections are between two endpoint devices and are available to communicate data for a remote application and/or a remote desktop. Based on the one or more path selection processes, data for the remote application and/or the remote desktop may be sent via a connection that differs from connection assignments that were configured when the connections were initially established. Additionally, as part of the one or more path selection processes, routing information that indicates a routing path may be inserted into data sent via the connections. An intermediary device may be caused to route the data according to the routing path indicated by the routing information.

20 Claims, 9 Drawing Sheets

PATH SELECTION FOR MULTI-PATH CONNECTIONS IN A REMOTE COMPUTING ENVIRONMENT

FIELD

Aspects described herein generally relate to data communications between endpoint devices in a remote computing environment; and relate to selecting routing paths and/or connections from established, multi-path, connections in a remote computing environment.

BACKGROUND

Computer networks are omnipresent in daily life. Innumerous services rely on the data communication provided by computer networks to function correctly and efficiently. Ensuring computer networks are implemented, and otherwise used, in efficient ways remains challenging. Services often have their own data communication requirements and those data communication requirements can differ from each other greatly. As an example, some services may be intolerant to data loss and have a requirement that data always be delivered to its endpoint, while other services may be tolerant to data loss and not have such a requirement. In view of the differences in data communication requirements, solutions that address the data communication requirements of a first set of services may not apply to a second set of services. Moreover, the condition of computer networks can change over time. A computer network may satisfy the data communication requirements of a service for a time, but its performance may degrade such that the computer network no longer satisfies the service's data communication requirements. If a service's data communication requirements are not met, many problems may arise. The service's quality may diminish. The service's user experience may diminish. The service may even fail.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards improving techniques in which data for a remote application, a remote desktop, or other remote service is communicated between two endpoint devices. As some examples, one or more path selection processes may be performed by an endpoint device that determines one or more connection conditions for established connections between the endpoint devices. Data for the remote application, remote desktop, or other remote service may be sent via a connection determined based on the one or more connection conditions. This connection may differ from connection assignments configured when the established connections were initially established. The connection may be determined based on data types associated with the remote application, remote desktop, and/or other remote service. In some instances, the connection may differ from the connection assignments because the connection now satisfies data communication requirements of the data type. As some further examples, one or more path selection processes may be performed by an endpoint device that inserts routing information into data being sent via the connection. The routing information may indicate a routing path that the data should be routed along. In this way, an intermediary device that receives the data may be caused to route the data according to the routing path indicated by the routing information.

The above aspects, greater details to the above aspects, as well as additional aspects will be appreciated with the benefit of the below discussion.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
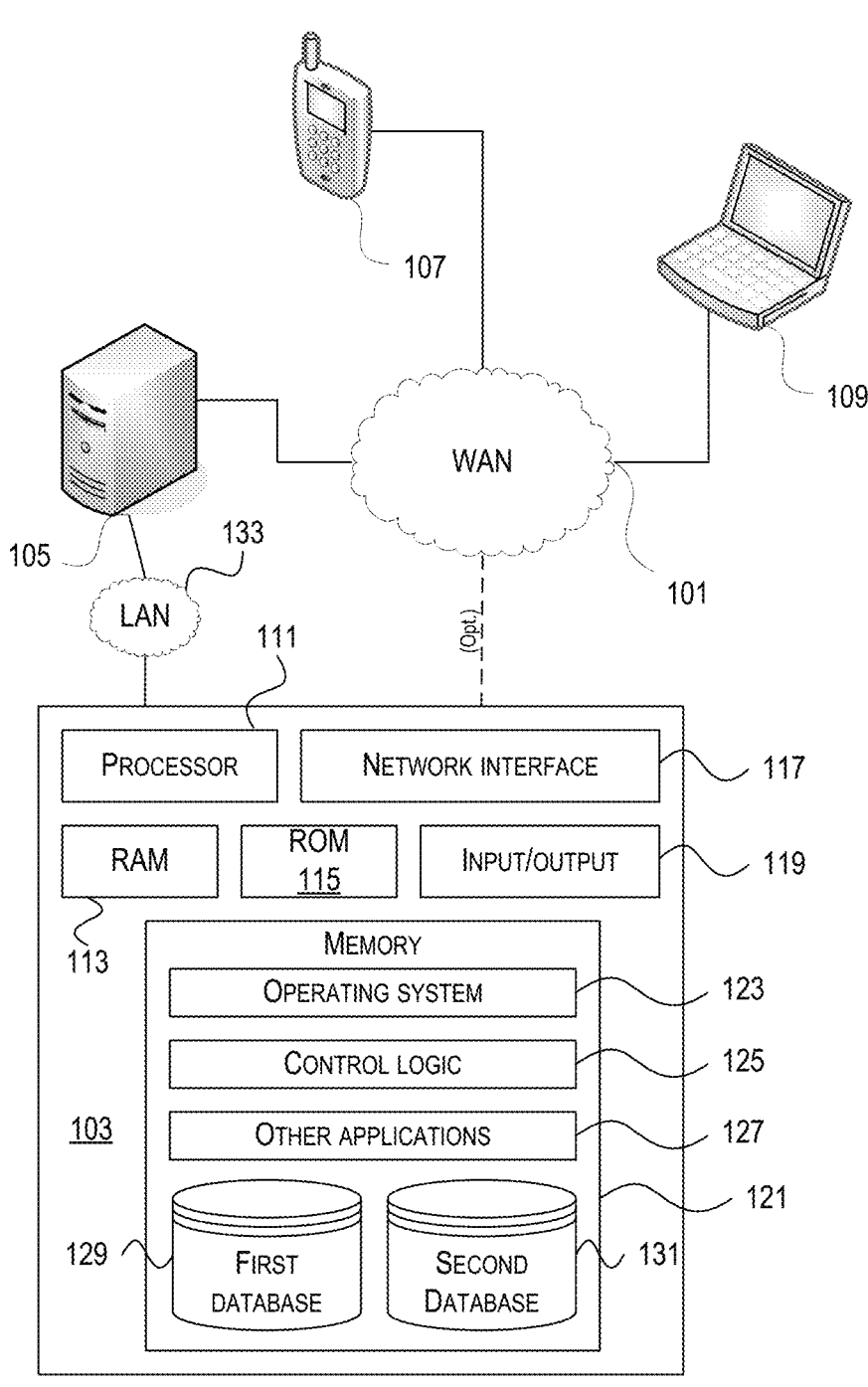
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards data communications between endpoint devices in a remote computing environment. In some embodiments, one of the endpoint devices may be hosting, or otherwise providing, a remote application, a remote desktop, or some other remote service, to another of the endpoint devices. In this way, plural connections may have been established between the endpoint devices and these plural connections may be available to communicate data between the endpoint devices. As data for the remote application, remote desktop, or other remote service is communicated between the end-point devices, connection conditions for the plural connections may be determined. These connection conditions may be used as a basis for selecting which of the plural connections will be used to communicate data between the endpoint devices. Further, routing information may be inserted into the communicated data. This routing information may indicate a routing path that an endpoint device has selected for the communicated data. This routing information may be processed by intermediary devices located between the endpoint devices such that the communicated data is routed according to the routing path.

As used herein, a remote computing environment may be a computing environment in which one or more computing devices are configured to provide a remote application, a remote desktop, or some other remote service to another computing device. Examples of a remote computing environment include the remote-access (also known as remote desktop), virtualized, and/or cloud-based environments that are discussed below in connection with FIGS. 1-4. The remaining drawings, FIGS. 5-7, 8A and 8B, provide examples in which endpoint devices of a remote computing environment may send data to each other based on one or more path selection processes. The one or more path selection processes may determine connection conditions and send data via established, multi-path, connections.

As used herein, an endpoint device may be any computing device that is a destination for data associated with a remote application, remote desktop, or other remote service. As some examples, an endpoint device may be a user computing device, such as a laptop, personal computer, mobile device, tablet computer, and the like. The user computing device may send data for the remote application, remote desktop, or other remote service (e.g., data indicating user interactions with the remote application, remote desktop, or other remote service, such as mouse clicks, touch input, focus events, and the like) to a server, virtualization server, virtual machine, or other server-side computing device. In this way, the server, virtualization server, virtual machine, or other server-side computing device may be another endpoint device. The server, virtualization server, virtual machine, or other server-side computing device may be hosting the remote application, remote desktop, or other remote service. Based on such hosting, the server, virtualization server, virtual machine, or other server-side computing device may be sending data for the remote application, remote desktop, or other remote service (e.g., data indicating graphics or user interface elements for the remote application, remote desktop, or other remote service) to the user computing device. The two endpoint devices may have plural connections established for communicating data between themselves. As will be described in more detail below, either, or both, of the two endpoint devices may perform one or more path selection processes to, among other things, select which of the plural connections will be used to communicate data between the two endpoint devices. Either, or both, of the two endpoint devices may insert routing information into the communicated data, which may allow intermediary devices between the two endpoint devices to route the communicated data according to a routing path.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines.

FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
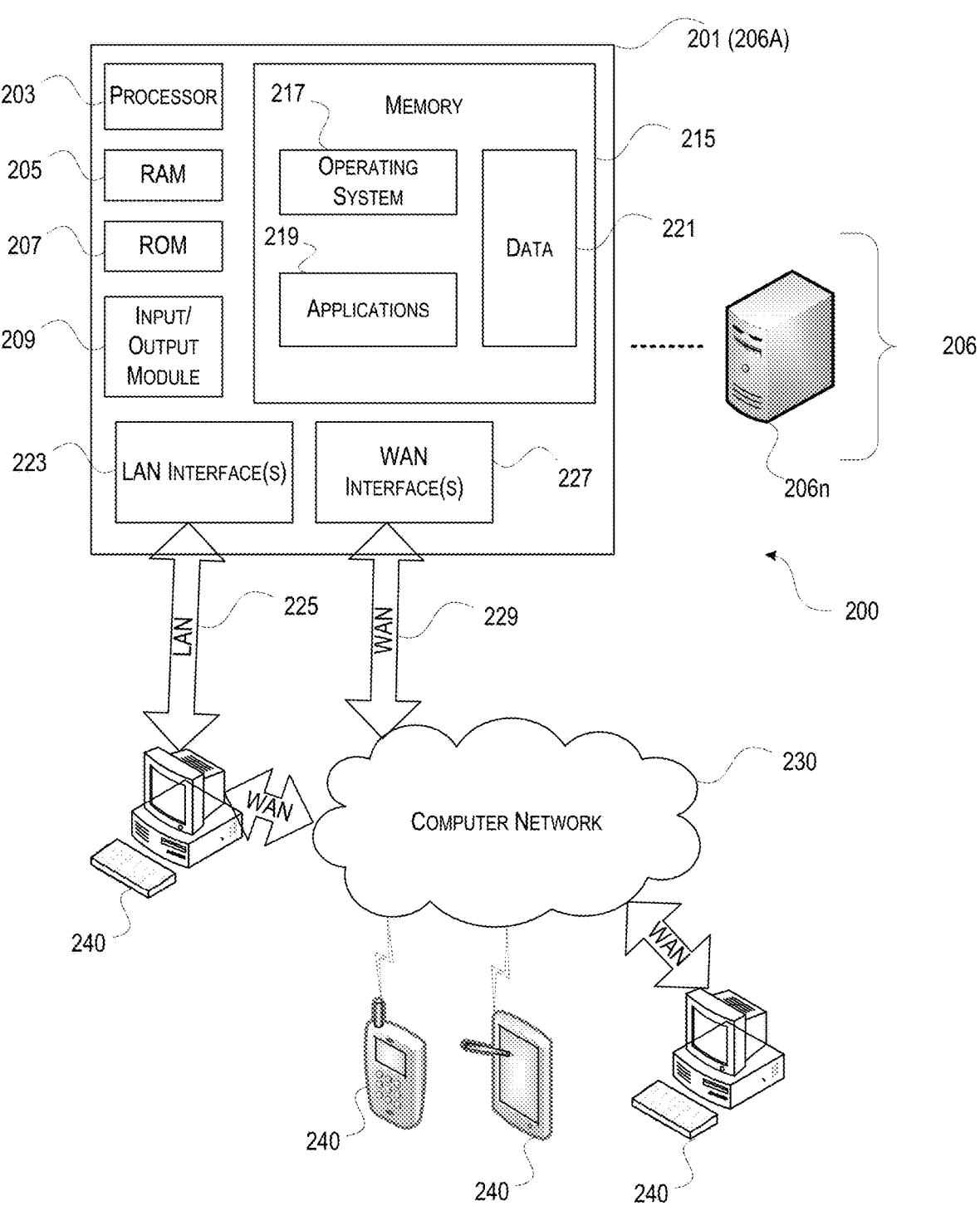
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. An application remotely executing on a server 206 or other remotely located machine may be interchangeably referred to herein as a remote application. Similarly, a desktop or other service being executed on a server 206 or other remotely located machine may be interchangeably referred to herein, respectively, as a remote desktop or other remote service.

The server 206, in some embodiments, use a thin-client or remote-display protocol to send data to a thin-client or remote-display application executing on the client to present display output generated by an application executing on the server 206. The thin-client or remote-display protocol may also be used to send data from the client and to the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
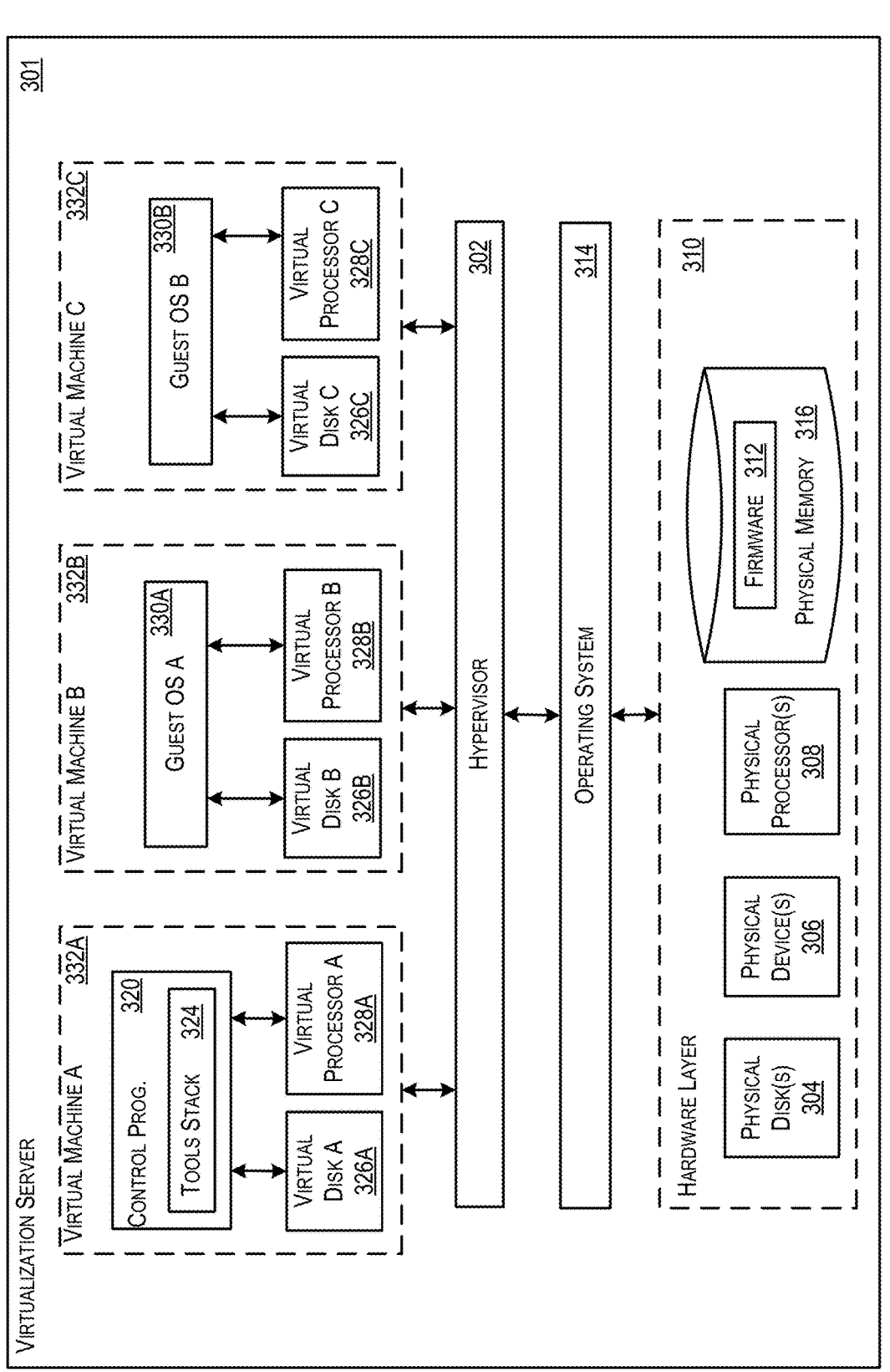
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
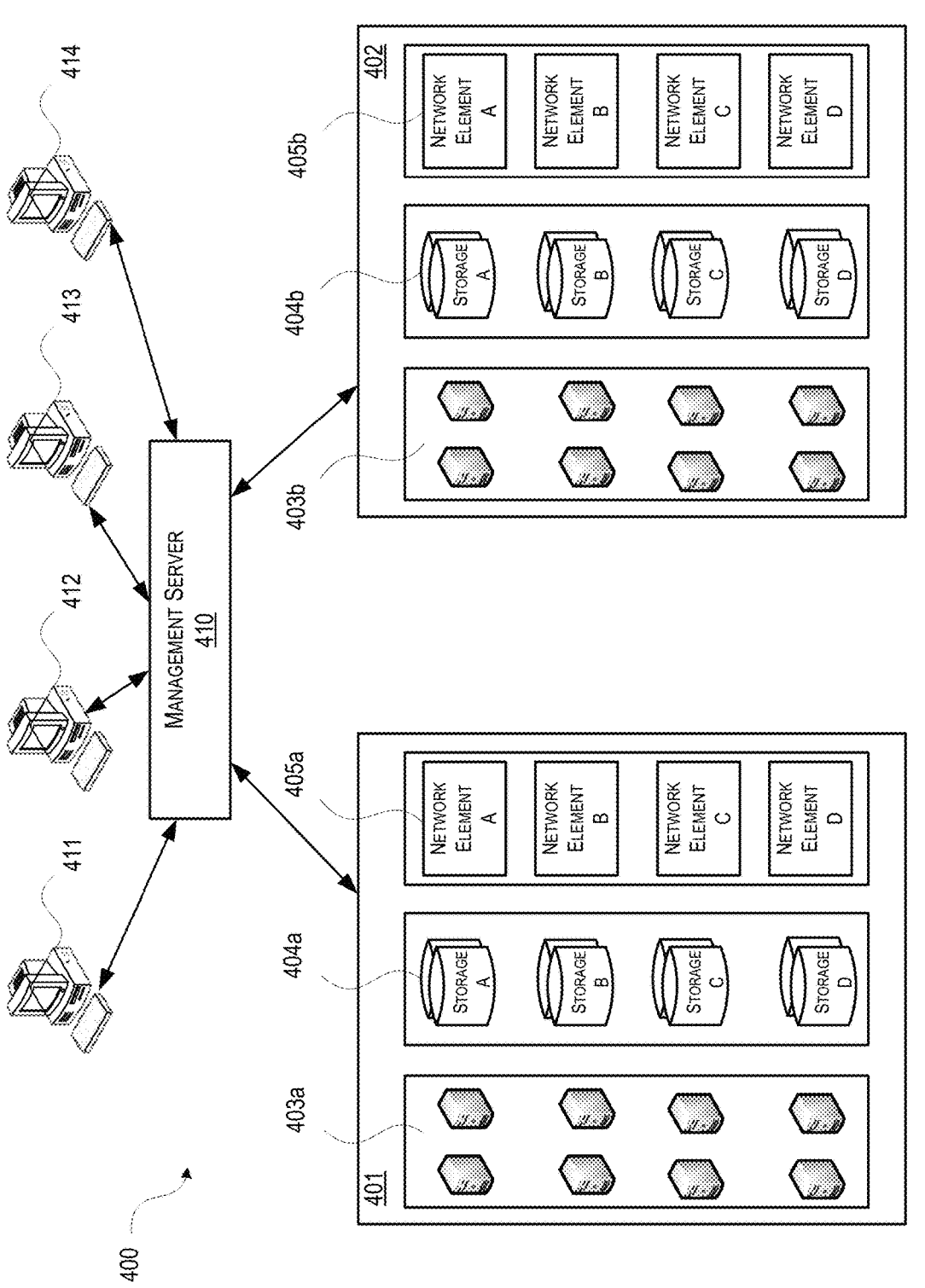
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Path Selection for Multi-Path Connections in a Remote Computing Environment

Figure 5:
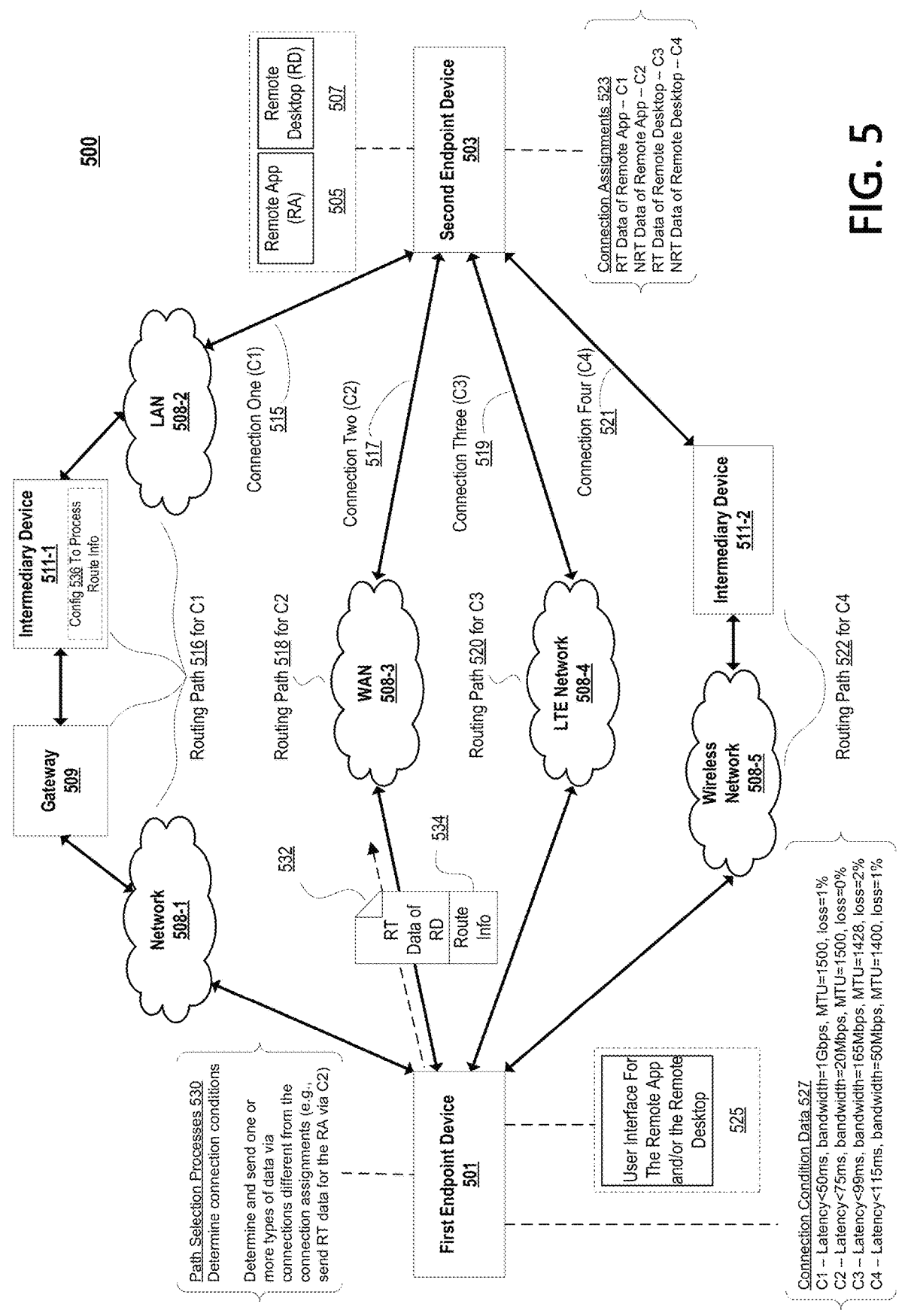
FIG. 5 depicts a block diagram of an example remote computing environment in which endpoint devices may send data to each other based on one or more path selection processes that determine connection conditions and send the data via established, multi-path, connections.

FIG. 5 depicts a block diagram of an example remote computing environment 500 in which endpoint devices may send data to each other based on one or more path selection processes. As depicted in FIG. 5, the example remote computing environment 500 may include a first endpoint device 501 and a second endpoint device 503, and plural connections 515, 517, 519, 521 over which the two endpoint devices 501, 503 may send data to each other. The two endpoint devices 501, 503 may be any computing device that is a destination for data associated with a remote application, remote desktop, or other remote service. The example remote computing environment 500 depicts an example arrangement in which the first endpoint device 501 is a user computing device and the second endpoint device 503 is a server-side computing device. In this way, the first endpoint device 501 may be any of the devices 107 or 109 (as depicted in FIG. 1), the client machine 240 (as depicted in FIG. 2), or some other user computing device. The second endpoint device 503 may be and/or include any of data server 103 or web server 105 (as depicted in FIG. 1), server 206 (as depicted in FIG. 2), virtualization server 301 (as described in FIG. 3), any of the virtual machines 322A-C, any of the host servers 403 (as depicted in FIG. 4), or some other server-side computing device. The example remote computing environment 500 shows this arrangement for the two endpoint devices 501, 503 for simplicity. In other arrangements, the first endpoint device 501 may be a server-side computing device and/or the second endpoint device 503 may be a user computing device. In general, the endpoint devices 501, 503 may be any computing device that is a destination for data associated with a remote application, remote desktop, or other remote service.

As depicted in the example remote computing environment 500, the second endpoint device 503 is hosting a remote application 505 and/or a remote desktop 507. The first endpoint device 501 is displaying, or is otherwise outputting for display, a user interface 525 for the remote application 505 or the remote desktop 507. Data for the remote application 505 and/or the remote desktop 507 may be communicated between the two endpoint devices 501, 503 via one or more of the plural connections 515, 517, 519, 521. The remote application 505 and/or the remote desktop 507 are depicted in FIG. 5 for simplicity, as the two endpoint devices 501, 503 may communicate data for a different remote service (not shown in FIG. 5).

The data for the remote application 505 and/or the remote desktop 507 that is being communicated between the two endpoint devices 501, 503 may include, among other things, data indicating interactions with the remote application 505 and/or the remote desktop 507 (e.g., mouse clicks, touch input, focus events) that the second endpoint device 503, based on it hosting the remote application 505 and/or the remote desktop 507, may process to update the remote application 505 and/or the remote desktop 507. The data for the remote application 505 and/or the remote desktop 507 may include graphical data, image data, video data, and the like for display as part of the user interface 525. In general, the data for the remote application 505 and/or the remote desktop 507 may include any data that can be communicated according to a thin-client or remote-display protocol (e.g., ICA) including, for example, control data for the thin client or remote-display protocol.

The plural connections 515, 517, 519, 521 may have been established according to a particular remote computing technology or infrastructure. For example, the plural connections 515, 517, 519, 521 may have been established based on a virtual desktop infrastructure (VDI) such as a VDI provided by Citrix Systems, Inc., that includes a virtual desktop agent (VDA) that is installed on each machine that hosts, or otherwise delivers, the remote application 505 and/or the remote desktop 507 to user computing devices. In such an example, the second endpoint device 503 may be installed with a VDA and the VDA may have established the plural connections 515, 517, 519, 521.

As one example illustrating how the plural connections 515, 517, 519, 521 may be established, the second endpoint device 503, by executing the VDA, may communicate with a controller of the VDI (e.g., Delivery Controller provided by Citrix Systems, Inc.; or some other management device, such as management server 410 of FIG. 4). Based on the communication with the controller of the VDI, the second endpoint 503, remote application 505 and/or the remote desktop 507 may be made available to user computing devices of the remote computing environment 500, such as the first endpoint device 501. When the first endpoint device 501 initiates a session for the remote application 505 and/or the remote desktop 507, the first endpoint device 501 may be assigned, by the controller of the VDI, to the second endpoint device 503 such that the second endpoint device 503 will host the remote application 505 and/or the remote desktop 507 for the first endpoint device 501. The VDA of the second endpoint device 503 may negotiate and establish connections for communicating data associated with the remote application 505 and/or the remote desktop 507 between the two endpoint devices 501, 503.

The example remote computing environment 500 shows that this negotiation and establishment process of the VDA may result in four different connections being established between the two endpoint devices 501, 503: connection one (C1) 515, connection two (C2) 517, connection three (C3) 519, and connection four (C4) 521. These four different connections are referred collectively as plural connections 515, 517, 519, 521. The plural connections 515, 517, 519, 521 may remain established until the VDA tears down the plural connections 515, 517, 519, 521. In some instances, the plural connections 515, 517, 519, 521 may remain established for as long as the second endpoint device 503 is assigned to host the remote application 505 and/or the remote desktop 507 and/or for as long as the first endpoint device 501 and the second endpoint device 503 maintain a session of the remote application 505 and/or the remote desktop 507. In this way, the plural connections 515, 517, 519, 521 may be available for data communication between the two endpoint devices 501, 503 while the second endpoint device 503 is assigned to host the remote application 505 and/or the remote desktop 507. The plural connections 515, 517, 519, 521 may each be configured according to a particular thin-client or remote-display protocol (e.g., ICA).

The four different connections depicted in the example remote computing environment 500 is only one example of the number of connections that can be established between the two endpoint devices 501, 503. In some arrangements, the number of different connections that can be established between the two endpoint devices 501, 503 may depend on the capabilities of the two endpoint devices 501, 503. For example, the number of different connections that can be established between the two endpoint devices 501, 503 may depend on the network interfaces configured on either, or both, of the two endpoint devices 501, 503. In this way and based on the example remote computing environment 500, the two endpoint devices 501, 503 may be each configured with the network interfaces necessary to establish the connections via the various networks 508-1 to 508-5 depicted in FIG. 5 (e.g., the first endpoint device 501 and the second endpoint device 503 may each be configured with at least a LAN interface, a WAN interface, an LTE interface, and/or a wireless interface). If the first endpoint device 501 and/or the second endpoint device 503 was not configured with a particular network interface (e.g., a network interface that allows the establishment of connection four 521), then fewer connections may be established between the two endpoint devices 501, 503 (e.g., only three connections 515, 517, 519 may be established between the two endpoint devices 501, 503). If the first endpoint device 501 and/or the second endpoint device 503 was configured with an additional network interface, then a greater number of connections may be established between the two endpoint devices 501, 503 (e.g., connections 515, 517, 519, 521 and an additional connection not shown in FIG. 5 may be established between the two endpoint devices 501, 503).

As depicted in the example remote computing environment 500, the plural connections 515, 517, 519, 521 are shown as each having different routing paths 516, 518, 520, 522. These routing paths 516, 518, 520, 522 illustrate how data being sent over a particular connection may be routed between the two endpoint devices 501, 503. In this way, the routing paths 516, 518, 520, 522 are depicted as including various networks (e.g., networks 508-1 to 508-5) and intermediary devices (e.g., gateway 509, intermediary device 511-1, and intermediary device 511-2). In general, an intermediary device may be any network element comprising hardware and/or software configured to route data, such as firewalls, network address translators, load balancers, virtual private network (VPN) gateways, Dynamic Host Configuration Protocol (DHCP) routers, gateway devices, and the like.

As depicted in FIG. 5, the routing path 516 for connection one 515 includes a network 508-1, a gateway 509, an intermediary device 511-1, and a LAN-2. The routing path 518 for connection two 517 includes a WAN 508-3. The routing path 520 for connection three 519 includes an LTE network 508-4. The routing path 522 for connection four 521 includes a wireless network 508-5 and intermediary device 511-2.

The routing paths 516, 518, 520, 522 depicted in FIG. 5 are simplified examples. Indeed, a routing path may include many more networks and intermediary devices. As one example based on the routing path 522 for connection four 521, a second LTE network (not shown) or another LAN may exist between the second endpoint device 503 and the intermediary device 511-2 and, therefore, be included in the routing path 522. Further, traffic may be routed according to more complicated pathing than those depicted in FIG. 5. As one example based one the routing path 522 for connection four 521, the intermediary device 511-2 may send routed traffic via the LTE network 508-4, which may further be routed via another LAN network (not shown in FIG. 5) before ultimately being received by the second endpoint device 503. Additionally, routing paths may change over time, due to data being routed to different intermediary devices (e.g., based on load balancing performed as traffic is being routed). As one example based on the routing path 522 for connection four 521, intermediary device 511-2 may not receive all traffic communicated via connection four 521 and, instead, a different intermediary device (not shown) may receive some traffic communicated via connection four 521.

The gateway 509 may be part of a cloud computing platform that provides a particular network service for the endpoint devices 501, 503. For example, the gateway 509 may be part of a cloud computing platform and any data that is routed via the gateway 509 may be processed by the cloud computing platform in particular ways. For example, the cloud computing platform may guarantee threshold performance levels of routed traffic received via the gateway 509; the cloud computing platform may prioritize data communications received via the gateway 509; the cloud computing platform may enforce certain levels of security for routed traffic received via the gateway 509 such as single sign on (SSO), encryption protocols, and/or licensing schemes. In some arrangements, there may be a cost associated with sending data via the gateway 509 (e.g., a user associated with the first endpoint device 501 may be billed for data received via the gateway 509 and subsequently processed by the cloud computing platform). In this way, the example computing environment 500 depicts a routing path 516 through a cloud computing platform that is accessed via the gateway 509. Thus, any data communicated between the two endpoint devices 501, 503 via connection one 515 may be subject to the cost associated with sending data via the gateway 509. In some arrangements, cloud computing platform may include the gateway 509, the intermediary device 511-1, the LAN 508-2, and the second endpoint device 503.

With connection one 515 being shown with a routing path 516 that includes the gateway 509, the other three connections 517, 519, 521 may be understood to bypass the gateway 509. In this way, the gateway 509 may not receive any data sent via connection two 517, connection three 519, and connection four 521. Moreover and based on the gateway 509 being bypassed, any data sent via connection two 517, connection three 519, and connection four 521 may not be subject to the cost associated with sending data via the gateway 509. Any data sent via connection two 517, connection three 519, and connection four 521 may be processed differently than data received via the gateway 509. For example, any data sent via connection two 517, connection three 519, and connection four 521 may not be guaranteed threshold performance levels of routed traffic; may not be prioritized for transport; and/or certain levels of security may not be enforced.

As part of establishing the plural connections 515, 517, 519, 521, connection assignments 523 may be configured and indicate how data should be sent via the plural connections 515, 517, 519, 521. The connection assignments 523 may be configured by the second endpoint device 503, the VDA installed on the second endpoint device 503, or some other element of the VDI (e.g., the controller of the VDI).

In some arrangements, the connection assignments 523 may indicate that one or more types of data associated with the remote application 505 and/or the remote desktop 507 are to be sent over particular connections. The types of data indicated by the connection assignments 523 may be based on the remote application 505, the remote desktop 507, and/or a thin-client or remote-display protocol (e.g., ICA).

In general, each type of data indicated by the connection assignments 523 indicates data that has different data communication requirements. For example, one type of data may require low latency (e.g., real time data, such as a mouse click, may require low latency) while another type of data may require high bandwidth (e.g., non-real time data, such as a file download, may require high bandwidth). The connection assignments 523 may be performed in a way that attempts to satisfy the data communication requirements of the various types of data. For example, real time data of the remote application 505 may be assigned to connection one 515 because it has the lowest latency of the four connections 515, 517, 519, 521 at a time the plural connections 515, 517, 519, 521 were established. A type of data may be interchangeably referred to herein as a data type. A data communication requirement may be interchangeably referred to herein as a requirement.

As depicted in FIG. 5, the connection assignments 523 indicate two different types of data: real time data ("RT data") and non-real time data ("NRT data"). The two different types of data are assigned connections for each of the remote application 505 and the remote desktop 507. In particular, real time data of the remote application 505 is assigned to connection one 515 ("RT data of Remote App—C1"), non-real time data of the remote application 505 is assigned to connection two 517 ("NRT data of Remote App—C2"), real time data of the remote desktop 507 is assigned to connection three 519 ("RT data of Remote Desktop—C3"), and non-real time data of the remote desktop 509 is assigned to connection four 521 ("NRT data of Remote Desktop—C4"). The differences in connection assignments for the remote application 505 and the remote desktop 507 may be based on one or more pre-established policies (e.g., a user previously signed up to pay costs with using the gateway 509 for the remote application 505; a network operator has prioritized the remote application 505 over the remote desktop 507 such that the remote application 505 is assigned to connection one 515 that has a routing path 516 with the gateway 509).

Table I provides examples of types of data associated with the remote application 505 and/or the remote desktop 507. In this way, Table I provides examples of how data associated with the remote application 505 and/or the remote desktop 507 may be classified into different types of data. As indicated by the header row of Table I, the first column of Table I provides examples as to how data associated with the remote application 505 and/or the remote desktop 507 may be classified into particular types of data. The second column of Table I provides an example of the requirements for the particular types of data. The third column of Table I provides examples of data associated with the remote application 505 and/or the remote desktop 507 that satisfy the requirements for the particular types of data. Some examples shown in Table I are based on a thin-client or remote-display protocol (e.g., ICA). The examples provided by Table I are non-exhaustive, as data associated with a remote application 505 and/or remote desktop 507 may be classified into types of data in many different ways. Indeed, the use of different thin-client or remote-display protocols may result in data being classified into different types of data than those shown in Table I.

TABLE I

| Example classification into types of data | Example requirements | Example data associated with the remote application 505 and/or the remote desktop 507 |
| --- | --- | --- |
| A classification including two data types: real time data and non-real time data. | Real time data may be any data that requires low latency and/or low jitter, while non-real time data may be any data that does not require low latency. | An example of real time data may include mouse clicks, focus events, touch input, or other data indicative of user interaction with the remote application 505 and/or the remote desktop 507. An example of non-real time data may include printer data or file download data associated with the remote application 505 and/or the remote desktop 507. |
| A classification including at least two data types: real time data and bulk data. | Real time data may be any data that requires low latency and/or low jitter, but not high bandwidth. Bulk data may be any data that requires high bandwidth, but not low latency. | An example of real time data may include mouse clicks, focus events, touch input, or other data indicative of user interaction with the remote application 505 and/or the remote desktop 507. An example of bulk data may include web browser data and file download data associated with the remote application 505 and/or the remote desktop 507 |
| A classification including at least one or more types of data based on virtual streams pre-defined by a thin-client or remote-display protocol or ports pre-defined by a thin-client or remote-display protocol. | Virtual streams or ports may be pre-defined by a thin-client or remote-display protocol to carry particular types of data. These virtual streams may be associated with various different requirements such as low latency, high latency, low jitter, high jitter, low bandwidth, high bandwidth, small MTU size, large MTU size, low loss, high loss, and the like. A classification may include a type of data for each virtual channel or port pre-defined by a thin-client or remote-display protocol. | As example of virtual streams predefined by a thin-client or remote-display protocol include the following virtual channels for ICA: a virtual channel for audio data, a virtual channel for COM port data, a virtual channel for disk data, a virtual channel for graphical data, a virtual channel for parallel port data, a virtual channel for printer data, a virtual channel for smart card data, one or more virtual channels for third-party custom data, and a virtual channel for video data. |
| A classification including at least one type of data for connection assignment data | A type of data may be for sending connection assignment data and/or updates to the connection assignment data between the two endpoint devices 501, 503, and may have requirements to indicate how the connection assignment data and/or updates to the connection assignment data should be sent (e.g., low latency, low bandwidth, high loss). | An example of connection assignment data includes the connection assignments 523 and/or any updates determined by the path selection processes 530 performed by the first endpoint device 501. This example classification is shown to indicate that the connection assignments 523 and/or updates to the connection assignments 523 may, in some arrangements, be sent between the two endpoint devices 501, 503 in a manner similar to any other data associated with the remote application 505 and/or the remote desktop 507. In other arrangements, the connection assignments 523 and/or updates to the connection assignments 523 may be classified as a more generalized type of data (e.g., non-real time data) or may not be sent between the two endpoint devices 501, 503. |

Network conditions can change over time. In this way, the connection assignments 523, as they are initially configured, may fail to reflect the current network conditions. For example, performance of the WAN 508-3 may vary over time as certain intermediary devices are overloaded with traffic. Performance of the LTE network 508-4 may vary over time as the first endpoint device 501 experiences stronger or weaker signal strengths with the LTE network 508-4. Performance of the wireless network 508-5 may vary over time due to changing levels of interference, such as inclement weather. In this way, the requirements for the different types of data may no longer be satisfied by the current network conditions. For example, performance of the LTE network 508-4 may degrade and may no longer satisfy the low latency and/or low jitter requirements of the real time data of the remote desktop 507. To address these changing network conditions, the first endpoint device 501 and/or the second endpoint device 503 may perform path selection processes 530 that may result in data being sent between the two endpoint devices 501, 503 in a way that is different from the connection assignments 523. For simplicity, FIG. 5 depicts the first endpoint device 501 as performing path selection processes 530.

As depicted in the example remote computing environment 500, the first endpoint device 501 performs path selection processes 530 that, among other things, determines connection conditions for the plural connections 515, 517, 519, 521; stores the connection conditions as part of connection condition data 527; determines to send one or more types of data via connections that are different from the connection assignments 523; and sends data of the one or more types of data via the connections that are different from the connection assignments 523. For example, as depicted in FIG. 5, the first endpoint device 501, based on the path selection processes 530, sends real time data 532 of the remote desktop 507 via connection two 517. By sending the real time data 532 of the remote desktop 507 via connection two 517, the real time data 532 of the remote desktop 507 is being sent differently from the connection assignments 523, which assigns real time data of the remote desktop 507 to connection three 519. This difference may have resulted because performance of the LTE network 508-4 degraded and/or because performance of the WAN 508-3 improved. These performance improvements and/or degradations indicated by connection conditions determined as part of the path selection processes 530.

Connection conditions may include one or more of latency, jitter, bandwidth, MTU size, loss rate, and the like. A connection condition may be measured, or estimated, based on traffic sent between the two endpoints 501, 503 via the plural connections 515, 517, 519, 521. A connection condition may be determined using any suitable technique (e.g., MTU size may be determined based on path MTU discovery (PMTUD) or packetization-layer path MTU discovery (PLPMTUD); may be based on information extracted from data packets sent between the two endpoint devices 501, 503 (e.g., extract metadata, such as time codes or payload size, from data packets); and/or may be based on statistics or other heuristics (e.g., round-trip time, inter-packet arrival time) determined based on traffic sent between the two endpoints 501, 503.

The path selection processes 530 may determine one or more connection conditions for each of the plural connections 515, 517, 519, 521, and may repeatedly (e.g., iteratively and/or periodically) check for updated connection conditions. In some arrangements, the path selection processes 530 may include a process for each of the plural connections 515, 517, 519, 521 that determines connection conditions for the connection, and repeatedly check for updated connection conditions for the connection. The path selection processes 530 may include a first process for repeatedly determining one or more first connection conditions for connection one 515, a second process for repeatedly determining one or more second connection conditions for connection two 517, a third process for repeatedly determining one or more third connection conditions for connection three 519, and a fourth process for repeatedly determining one or more fourth connection conditions for connection four 521. These processes may be run as a background process and/or in parallel with other processes of the path selection processes 530.

The example remote computing environment 500 depicts the first endpoint device 501 as storing connection condition data 527. The connection condition data 527 may include connection conditions for the plural connections 515, 517, 519, 521 that were determined and stored as part of the path selection processes 530. As depicted, the connection condition data 527 includes one or more connection conditions for each of the plural connections 515, 517, 519, 521. The one or more connection conditions of the connection condition data 527 may be used as part of the path selection processes 530 to select a particular connection for sending data between the two endpoint devices 501, 503.

In some arrangements, the connection condition data 527 may include one or more conditions within a particular time window (e.g., connection conditions for the plural connections 515, 517, 519, 521 that have been determined within the last 5 minutes). In some arrangements, the connection condition data 527 may include one or more conditions based on recent activity of the plural connections 515, 517, 519, 521. In this way, the connection condition data 527 may include an estimation of current network conditions.

Because activity over the plural connections 515, 517, 519, 521 may vary over time and vary in activity with respect to each other, the connection condition data 527 may include conditions for the plural connections 515, 517, 519, 521 that differ from each other (e.g., data traffic received via connection one 515 may allow the path selection processes 530 to determine latency and bandwidth, but data traffic received via connection four 521 may allow the path selection processes 530 to determine a loss rate, latency, jitter, bandwidth, and MTU size). For example, for a period of time after the plural connections 515, 517, 519, 521 have been established or until a certain amount of activity has occurred on the plural connections 515, 517, 519, 521, certain connection conditions may be unable to be determined. The length of the period of time and/or amount of activity may depend on the techniques used to determine the connection conditions (e.g., a technique that determines a connection condition based on a larger amount of data may require a correspondingly greater period of time and/or greater amount of activity than another technique that determines a connection condition based on a smaller amount of data). In some arrangements, if the connection condition data 527 does not include a connection condition that corresponds to a requirement of a data type and/or does not include any connection conditions, the first endpoint device 501 may be configured to use default connection assignments such as those shown by the connection assignments 523.

As depicted in FIG. 5, the connection condition data 527 includes example connection conditions for the plural connections 515, 517, 519, 521, and example values for each connection condition. As depicted in FIG. 5, the connection condition data 527 includes latency, bandwidth, MTU size, and loss rate for each of the plural connections 515, 517, 519, 521. For connection one 515 (e.g., the row for C1 in the connection condition data 527), the connection condition data 527 is shown as including an example latency of 50 milliseconds to indicate determined latency is less than 50 milliseconds; an example bandwidth of 1 Gigabit per second (Gbps) to indicate determined bandwidth is up to 1 Gbps; an example MTU size of 1500 to indicate a maximum MTU size is 1500 bytes; and an example loss rate of 1% to indicate a determined loss rate of 1%. For connection two 517 (e.g., the row for C2 in the connection condition data 527), the connection condition data 527 is shown as including an example latency of 75 milliseconds to indicate determined latency is less than 75 milliseconds; an example bandwidth of 20 Megabit per second (Mbps) to indicate determined bandwidth is up to 20 Mbps; an example MTU size of 1500 to indicate a maximum MTU size is 1500 bytes; and an example loss rate of 0% to indicate a determined loss rate of 0%. For connection three 519 (e.g., the row for C3 in the connection condition data 527), the connection condition data 527 is shown as including an example latency of 99 milliseconds to indicate determined latency is less than 99 milliseconds; an example bandwidth of 165 Mbps to indicate determined bandwidth is up to 165 Mbps; an example MTU size of 1428 to indicate a maximum MTU size is 1428 bytes; and an example loss rate of 2% to indicate a determined loss rate of 2%. For connection four 521 (e.g., the row for C4 in the connection condition data 527), the connection condition data 527 is shown as including an example latency of 115 milliseconds to indicate determined latency is less than 115 milliseconds; an example bandwidth of 50 Mbps to indicate determined bandwidth is up to 165 Mbps; an example MTU size of 1400 to indicate a maximum MTU size is 1400 bytes; and an example loss rate of 1% to indicate a determined loss rate of 1%. The examples shown in the connection condition data 527 illustrate only a few examples of the connection conditions, and their values, that may be included by the connection condition data 527. The connection condition data 527 may include more, or fewer, connection conditions for each of the plural connections 515, 517, 519, 521 that the examples depicted by FIG. 5. As one example, the connection condition data 527 may include jitter as another connection condition for the plural connections 515, 517, 519, 521 in addition to the latency, bandwidth, MTU size, and loss rate depicted by FIG. 5.

As part of the path selection processes 530, the first endpoint device 501 may have used the connection condition data 527 as a basis for determining to send the real time data 532 of the remote desktop 507 via connection two 517. For example, as depicted in FIG. 5, the connection condition data 527 includes a latency for connection three 519 ("Latency<99 ms") that indicates latency for connection three 519 is less than 99 milliseconds. Based on the connection assignments 523, this latency for connection three 519 may be compared to a threshold to determine whether the latency meets the requirements of the real time data for the remote desktop 507. If the latency is below the threshold (e.g., 99 milliseconds is below a threshold of 100 milliseconds), the requirements of the real time data for the remote desktop 507 may be met (and thus the first endpoint device 501 may continue sending real time data of the remote desktop 507 via connection three 519). If the latency is above the threshold (e.g., 99 milliseconds is above a threshold of 80 milliseconds), the requirements of the real time data for the remote desktop 507 may not be met. Thus, as depicted in FIG. 5, the first endpoint device 501 may, based on the latency of connection three 519 not satisfying the latency requirement of the real time data 532 (e.g., 99 milliseconds is above a threshold of 80 milliseconds), determine to send the real time data 532 of the remote desktop 507 via connection two 517. Connection assignments may be updated to indicate that real time data for the remote desktop 507 is to be sent via connection two 517 (e.g., connection assignments local to the first endpoint device 501, not shown in FIG. 5, may be updated; and/or the second first endpoint device 501 may send data so that the second endpoint device 503 updates the connection assignments 523 to indicate that real time data for the remote desktop 507 is to be sent via connection two 517).

As another example, as depicted in FIG. 5, the connection condition data 527 may include a latency for connection two 517 ("C2—Latency<75 ms"). This latency for connection two 517 may be compared to the latency for connection three 519 to determine which is greater. If the latency for connection two 517 is greater than the latency for connection three 519, the first endpoint device 501 may, based on a requirement for real time data being for low latency, continue sending real time data of the remote desktop 507 via connection three 519. If the latency for connection two 517 is less than the latency for connection three 519, the first endpoint device 501 may, based on a requirement for real time data being for low latency, determine to send the real time data 532 of the remote desktop 507 via connection two 517. As depicted in FIG. 5, the latency for connection two 517 is less than the latency for connection three 519 (e.g., 75 ms is less than 99 ms). Based on the latency for connection two 517 being less than the latency for connection three 519, the first endpoint device 501 may determine to send the real time data 532 via connection two 517. Connection assignments may be updated to indicate that real time data for the remote desktop 507 is to be sent via connection two 517 (e.g., connection assignments local to the first endpoint device 501, not shown in FIG. 5, may be updated; and/or the second first endpoint device 501 may send data so that the second endpoint device 503 updates the connection assignments 523 to indicate that real time data for the remote desktop 507 is to be sent via connection two 517).

As part of the path selection processes 530 and in addition to the connection condition data 527, the first endpoint device 501 may have used additional criteria as a basis for determining to send the real time data 532 of the remote desktop 507 via connection two 517. For example, as depicted in FIG. 5, the connection condition data 527 includes a latency for connection one 515 ("Latency<50 ms") that is less than the latency for connection three 519 ("Latency<99 ms"). Even with the latency for connection one 515 being less than the latency of connection three 519, the first endpoint device 501 may, as part of the path selection processes 530, determine to continue sending real time data for the remote desktop 507 via connection three 519. Continuing this example, the first computing device 501 may determine, based on the additional criteria, that real time data of the remote desktop 507 is not able to be subject to a cost associated with routing via the gateway 509 (e.g., a user of the remote desktop 507 has not signed up to be billed for traffic routed via the gateway 509). Accordingly, the first endpoint device 501 may determine to continue sending real time data for the remote desktop 507 via connection three 519 based on the additional criteria of a cost associated with the gateway 509. Alternatively, if the first endpoint device 501 determines that real time data for the remote desktop 507 is able to be subject to a cost associated with routing via the gateway 509 (e.g., a user of the remote desktop has signed up to be billed for traffic routed via the gateway 509), the first endpoint device 501 may determine to send real time data for the remote desktop 507 via connection one 515. Further examples, and details, of additional criteria that may be used in addition to the connection condition data 527 will be discussed below and at least in connection with FIGS. 7 and 8B.

The real time data 532 of the remote desktop 507 is depicted in FIG. 5 as including, or otherwise being accompanied by, routing information 534. In some arrangements, the first endpoint device 501 may, as part of the path selection processes 530, insert the routing information 534 into data that includes the real time data 532 of the remote desktop 507. The data to which the routing information 534 is inserted into may correspond to a particular layer of the Open Systems Interconnection (OSI) model. For example, the first endpoint device 501 may insert the routing information 534 in one or more datagrams (e.g., the transport layer of the OSI model) that include the real time data 532 as a payload or one or more packets (e.g., the network layer of the OSI model) that include the real time data 532 as a payload.

The routing information 534 may indicate a routing path that the first endpoint device 501 requests the real time data 532 be routed along. This indication may take the form of information indicating a type of network to route the real time data 532 along, a subnet to route the real time data 532 along, an intermediate device to route the real time data 532 towards, and the like. In some arrangements, the routing information 534 may include a value of a differentiated services code point (DSCP), which may be inserted into a differentiated services (DS or DiffServ) field of one or more packets. This value of a DSCP may be interchangeably referred to herein as a DSCP value. Additionally or alternatively, the routing information 534 may include one or more network identifiers, such as an identifier for a broadcast domain. DSCP values and/or VLAN identifiers provide just two examples of the ways in which the routing information 534 may indicate a routing path. Additionally or alternatively, the routing information 534 may include custom values and/or data fields of indicate a routing path.

The routing information 534 may cause the real time data 532 to be routed according to the routing path indicated by the routing information 534. For example, an intermediary device (e.g., intermediary device 511-1 and 511-2) may receive the real time data 532 and the routing information 534 (e.g., via one or more datagrams or one or more packets). The intermediary device may process the routing information 534 and, based on the routing path indicated by the routing information 534, route the real time data 532 and the routing information 534 according to the routing path (e.g., the one or more datagrams or the one or more packets may be routed to a next intermediary device according to the routing path). As one example, the routing information 534 may include a DSCP value and/or VLAN identifier, the intermediary device may route the real time data 532 based on the DSCP value and/or the VLAN identifier.

In some arrangements, an intermediary device may need to be specifically configured to route based on the routing information 534. For example, an intermediary device may need to be specifically configured to route based on any custom values and/or custom data fields included by the routing information 534. If an intermediary device is not specifically configured, it may not route based on at least a portion of the routing information 534. Instead the intermediary device may route based on any portion of the routing information 534 it is able to process (e.g., a DSCP value and/or VLAN identifier) or may route according to its normal routing tables and/or routing rules (e.g., the one or more datagrams or the one or more packets may be routed according to the normal routing tables and/or routing rules of the intermediary device). To be specifically configured to route based the routing information 534, an intermediary device may need to be installed, or configured with, specific software, hardware, and/or firmware that allows the intermediary device to route based on the routing information 534. The specific software, hardware, and/or firmware may be configured to operate in the OSI layer corresponding to where the routing information 534 was inserted (e.g., the transport layer or the network layer).

As depicted in FIG. 5, intermediary device 511-1 includes configuration 536 that allows the intermediary device 511-1 to process the routing information 534. Intermediary device 511-2 is not depicted as including the configuration. Accordingly, based on the depiction of FIG. 5, the intermediary device 511-1 may route based on the routing information 534. Intermediary device 511-2 may not route based on the routing information 534. In some arrangements, one or more intermediary devices that are specifically configured to route based on the route information may be part of a cloud computing platform (e.g., a cloud computing platform accessed via the gateway 509, a cloud computing platform that provides the VDI for accessing the remote application 505 and/or the remote desktop 507). In some instances, an operator of the cloud computing platform may specifically configure the one or more intermediary devices, such as intermediary device 511-1, to route based on the routing information 534. Additionally or alternatively, a provider of VDI, such as Citrix Systems Inc., may reach an agreement with one or more manufacturers of intermediary devices (e.g., a manufacturer of routers) to install, or otherwise configure, one or more models of intermediary devices with the necessary software, hardware, and/or firmware to route based on the routing information 534.

While FIG. 5 depicts the first endpoint device 501 as performing the path selection processes 530, the second endpoint device 503 may perform the path selection processes 530 instead of, or in addition to, the first endpoint device 501. In this way and as not shown in FIG. 5, the second endpoint device 503 may, among other things, determine connection conditions for the plural connections 515, 517, 519, 521 instead of, or in addition to, those determined by the first endpoint device 501; store the connection conditions as part of connection condition data instead of, or in addition to, the connection condition data 527 of the first endpoint device 501; determine to send one or more types of data via connections that are different from the connection assignments 523 instead of, or in addition to, any types of data determined by the first endpoint device 501 different from the connection assignments 523; and send data of the one or more types of data via the connections that are different from the connection assignments 523 instead of, or in addition to, any types of data sent by the endpoint device 501 differently from the connection assignments 523. In arrangements where both endpoint devices 501, 503 perform the path selection processes 530, the endpoint devices 501, 503 may be determining connection conditions that differ from each other. Indeed, the endpoint devices 501, 503 may operate under and/or observe network conditions that differ from each other. Based on these different network conditions, the endpoint devices 501, 503 may determine connection conditions that differ from each other (e.g., the first endpoint device 501 may determine a latency for connection one 515 that differs from a latency for connection one 515 that was determined by the second endpoint device 503).

In some arrangements, the connection assignments 523 and/or updates to the connection assignments 523 may be sent between the two endpoint devices 501, 503. In this way, changes to the connection assignments 523 may be distributed among and used by the two endpoint devices 501, 503 (e.g., the second endpoint device 503 may be informed that real time data, such as real time data 532, is to be sent via connection two). In other arrangements, the connection assignments 523 and/or updates to the connection assignments 523 may not be sent between the two endpoint devices 501, 503. In this way, changes to the connection assignments 523 may not be distributed among and used by the two endpoint devices 502, 503 (e.g., the second endpoint device 503 may send real time data via connection two 517 only if it determines to send real time data via connection two based on performance of its path selection processes).

Having discussed the example remote computing environment 500 of FIG. 5, example methods for performing the path selection processes 530 will be discussed in FIGS. 6 and 7. Further, example flows showing additional examples of the path selection processes, and the manner in which data is communicated between the two endpoint devices 501, 503 will be discussed in FIGS. 8A and 8B.

Figure 6:
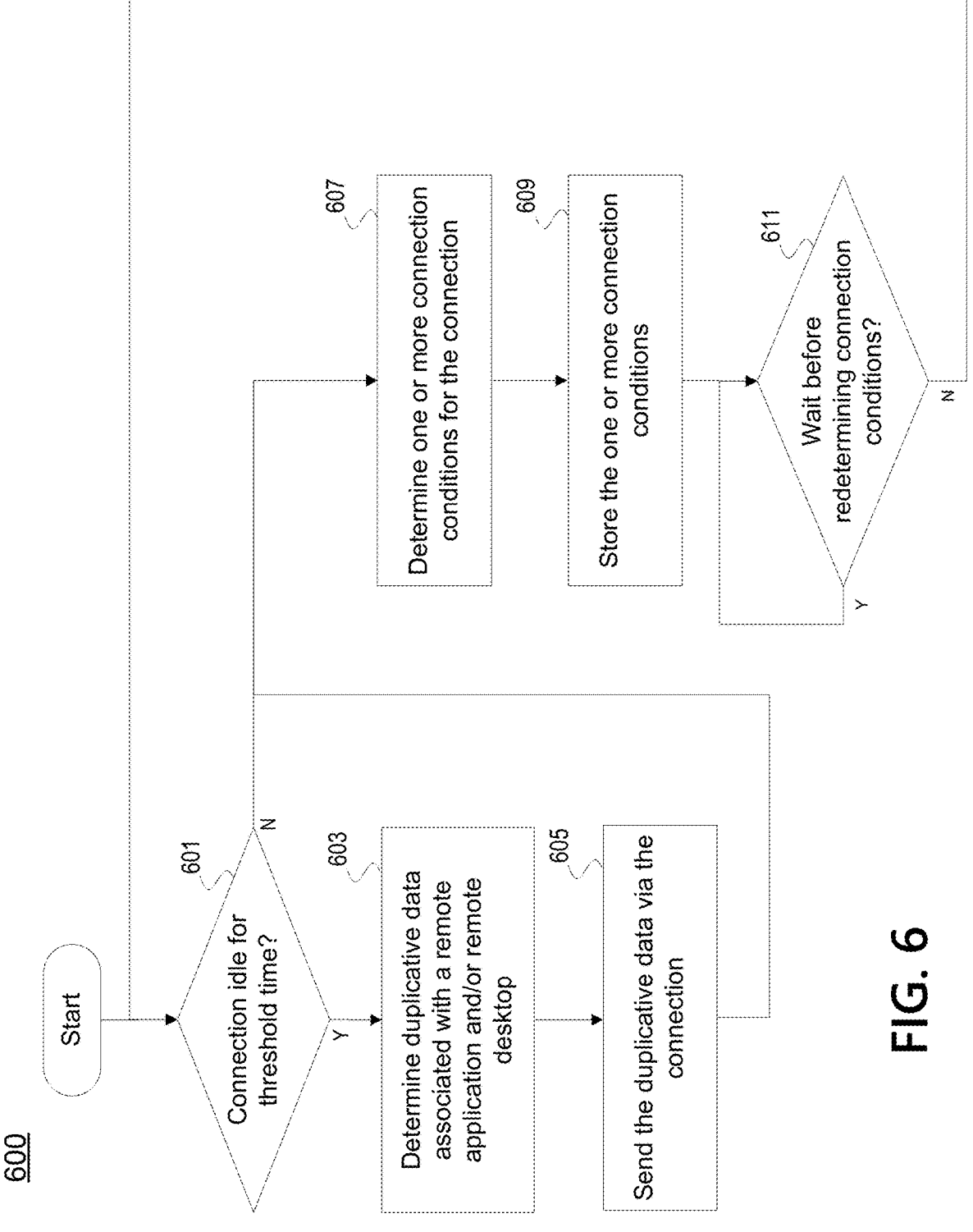
FIG. 6 depicts an example method for a path selection process that determines one or more connection conditions for a connection between endpoint devices in a remote computing environment.

FIG. 6 depicts an example method 600 for a path selection process that determines one or more connection conditions for a connection between endpoint devices in a remote computing environment. With respect to the example remote computing environment 500 of FIG. 5, the example method 600 may be one or more of the processes performed as part of the path selection processes 530. In particular, the example method 600 may be performed for each of the plural connections 515, 517, 519, 521. In this way, the path selection processes 530 may include a first process for connection one 515 that performs the example method 600 to determine one or more conditions for connection one 515; a second process for connection two 517 that performs the example method 600 to determine one or more conditions for connection two 517; a third process for connection three 519 that performs the example method 600 to determine one or more conditions for connection three 519; and a fourth process for connection four 521 that performs the example method 600 to determine one or more conditions for connection four 521. The four processes may be performed while the plural connections 515, 517, 519, 521 are established for the remote application 505 and/or the remote desktop 607 (e.g., the endpoint device may perform the four processes while the first endpoint device 501 and the second endpoint device 503 maintain a session of the remote application 505 and/or the remote desktop 507). The example method 600 may be performed as a background process or in parallel with other processes of the path selection processes 530 (e.g., the example method 600 may be performed in a separate thread for each connection, resulting in four threads being executed for the plural connections 515, 517, 519, 521). The one or more connection conditions determined by the example method 600 may be any of the conditions included in connection condition data 527 for a particular connection and later used as a basis for sending a type of data via one of the plural connections 515, 517, 519, 521 (e.g., the one or more connection conditions may be used as a basis for sending the real time data 532). For simplicity, the example method 600 will be discussed in terms of being performed by an endpoint device (e.g., any one of the two endpoint devices 501, 503).

A step 601, an endpoint device may determine whether a connection is idle for a threshold time. A connection being idle may mean that no data has been sent or received by the endpoint device via the connection. The threshold time may be in the order of seconds or minutes (e.g., a threshold of 15 seconds, a threshold of 5 minutes, and the like). If the connection is idle for more than the threshold time, the method 600 may initiate a process that generates activity on the connection to assist in determining connection conditions for the connection by proceeding to step 603. If the connection is not idle for more than the threshold time, the method may proceed to step 607.

By proceeding to step 603, the endpoint device may initiate a process that generates activity on the connection to assist in determining connection conditions for the connection. This process is represented in the method 600 by steps 603 and 605. As discussed in more detail below, the activity on the connection generated by this process may be used as a basis for determining one or more connection conditions.

At step 603, the endpoint device may determine duplicative data associated with a remote application and/or a remote desktop (e.g., the remote application 505 and/or the remote desktop 507 of FIG. 5). The duplicative data may include data previously sent from the endpoint device for the remote application and/or the remote desktop. The duplicative data may include data queued to be sent from the endpoint device for the remote application and/or the remote desktop. As some examples, the duplicative data may include an exact copy of the data previously sent or queued to be sent such that, when the duplicative data is received by the other endpoint device (e.g., endpoint device 503 of FIG. 5), the other endpoint device may ignore the duplicative data. Alternatively, the duplicative data may include an exact copy of the data previously sent or queued to be sent such that, when the duplicative data is received by the other endpoint device, the other endpoint device may send an acknowledgement indicating the duplicative data was received and then the other endpoint device may discard the duplicative data after determining the data is duplicative of other data received by the other endpoint device. As one example, if real time data 532 of FIG. 5 has just been sent or is queued to be sent by the endpoint device, the duplicative data may include an exact copy of the real time data 532. In general, the duplicative data may be determined such that, when the duplicative data is received by another endpoint device, the duplicative data may be ignored or discarded for being duplicative. The activity generated on the connection (e.g., the activity generated based on sending the duplicative data and/or any acknowledge to the duplicative data) may be used as a basis for determining one or more connection conditions (e.g., the endpoint device may determine one or more connection conditions based on this activity at step 607 and/or another endpoint device may determine one or more connection conditions based on this activity).

At step 605, the endpoint device may send the duplicative data via the connection. This duplicative data may be sent to another endpoint device (e.g., endpoint device 503 of FIG. 5). As discussed in connection with step 603, when the other endpoint device receives the duplicative data, the other endpoint device may ignore the duplicative data, or otherwise simply acknowledge receipt of the duplicative data and then discard the duplicative data. The sending of the duplicative data may allow the endpoint device and/or the other endpoint device (e.g., if the other endpoint device is also performing a method the same as or similar to the example method 600) to determine a connection condition for the connection. Indeed, based on sending the duplicative data, the endpoint device may be able to measure or estimate a connection condition, or determine a statistic or heuristic usable to determine a connection.

At step 607, the endpoint device may determine one or more connection conditions for the connection. The one or more connection conditions may include a latency for the connection, a bandwidth for the connection, an MTU size for the connection, a loss rate for the connection, and the like. This determination may be performed to measure, estimate, or otherwise calculate the one or more connection conditions based on traffic via the connection (e.g., traffic sent and/or received by the endpoint via the connection). A connection condition may be determined using any suitable technique (e.g., MTU size may be determined based on path MTU discovery (PMTUD) or packetization-layer path MTU discovery (PLPMTUD)); may be based on information extracted from data packets sent or received via the connection; and/or may be based on statistics or other heuristics (e.g., round-trip time) determined based on traffic sent or received by the endpoint. In some instances, the one or more connection conditions may be determined based on the duplicative data sent from the endpoint device and/or an acknowledgement to the duplicative data received by the endpoint device (e.g., round-trip time may be estimated based on the duplicative data and/or an acknowledgement to the duplicative data, one-way bandwidth may be estimated by inter-packet arrival time). In some instances, the one or more connection conditions may be determined based on activity generated by sending duplicative data and/or acknowledgements to the duplicative data via the connection.

At step 609, the endpoint device may store the one or more connection conditions. The one or more connection conditions may be stored in a data structure (e.g., connection condition data 527 of FIG. 5) for later use (e.g., for use by the example method 700 of FIG. 7). Further, storing the one or more connection conditions may overwrite, or otherwise update, the data structure (e.g., the connection condition data 527 of FIG. 5 may be overwritten or updated to store the one or more connection conditions determined at step 607). For example and using the connection condition data 527 of FIG. 5 as the data structure, if the one or more connection conditions includes latency, this latency may overwrite or update the latency for the connection stored by the connection condition data 527. In this way, the connection condition data 527 may store, or otherwise include the most recent connection conditions that have been determined by the endpoint. In some arrangements, storing the one or more connection conditions and/or overwriting or updating the connection condition data may trigger a timer to begin. This timer may specify a period of time to wait before proceeding to redetermine the one or more connection conditions for the connection.

At step 611, the endpoint device may determine whether to wait before redetermining the one or more connection conditions for the connection. In some arrangements, this determination may be based on expiration of a timer. In other words, the endpoint may wait until expiration of the timer before proceeding to redetermine the one or more connection conditions. This timer may be on the order of seconds or minutes (e.g., wait 30 seconds before proceeding to redetermine the one or more connection conditions; wait 5 minutes before proceeding to redetermine the one or more connection conditions). Accordingly, if the timer has not yet expired, the method 600 may proceed back to step 611 to continue waiting for the timer to expire. If the timer has expired, the method 600 may proceed to step 601 as a way to begin redetermining the one or more connection conditions for the connection.

Further, in some arrangements, the endpoint device may determine and send duplicative data over one or more connections as the endpoint device waits. In some instances, as the endpoint device waits for the timer to expire, the endpoint device may perform steps similar to steps 603-605. In this way, for example, the endpoint device may determine and send duplicative data via the connection, and then check for expiration of the timer after sending the duplicative data. The duplicative data sent as the endpoint device waits for expiration of the timer may include the same data as sent at step 605 (e.g., the endpoint device may, as it is waiting for expiration of the timer, send another copy of the duplicative data that was sent at step 605).

In view of FIG. 6 and the above discussion of the steps of FIG. 6, the example method 600 is shown as being an iterative or repeated process. In this way, the endpoint device, by performing the example method 600, may be iteratively or repeatedly sending duplicative data via the connection and/or determining one or more connection conditions for the connection. Based on the iterative or repeated nature of the example method 600, the endpoint device may be iteratively or repeatedly generating activity on the connection (based on iteratively or repeatedly sending duplicative data via the connection) and/or may be iteratively or repeatedly determining an estimation of current network conditions for the connection (e.g., based on iteratively or repeatedly determining the one or more connection conditions for the connection). The endpoint device may perform the example method 600 while the connection is established (e.g., the endpoint device may perform the example method 600 for the connection while the second endpoint device 503 hosts the remote application 505 and/or the remote desktop 507; the endpoint device may perform the example method 600 for the connection while the first endpoint device 501 and the second endpoint device 503 maintain a session of the remote application 505 and/or the remote desktop 507). In some arrangements that use a timer at step 611, the example method 600 may be performed iteratively or repeatedly based on the timer. In other words, the example method 600 may be performed periodically based on the time.

Figure 7:
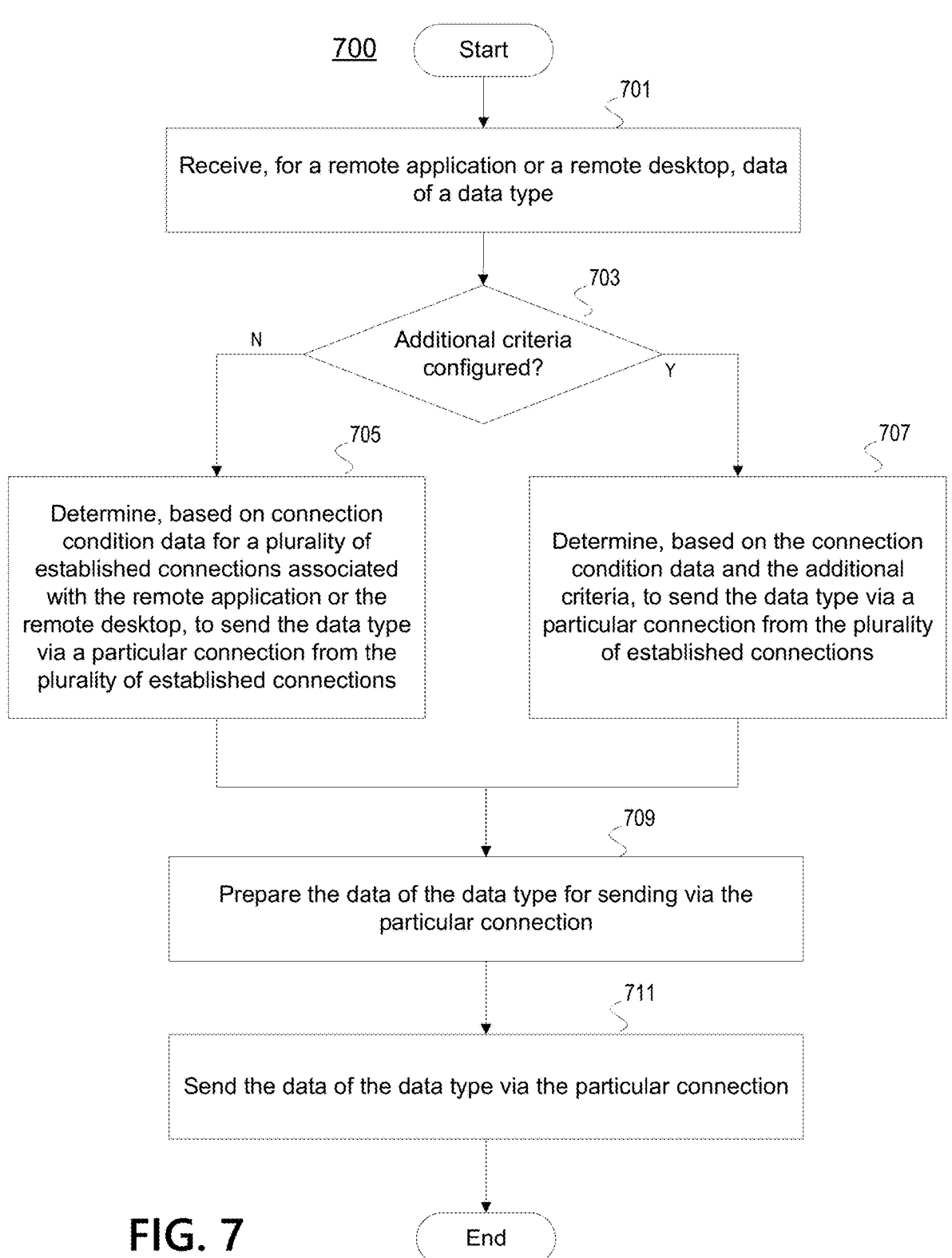
FIG. 7 depicts an example method for a path selection process that sends data via a connection between endpoint devices in a remote computing environment.

FIG. 7 depicts an example method 700 for a path selection process that sends data via a connection between endpoint devices in a remote computing environment. With respect to the example remote computing environment 500 of FIG. 5, the example method 700 may be at least one of the processes performed as part of the path selection processes 530. The example method 700 may be performed each time an endpoint device receives data that is associated with a remote application and/or a remote desktop, and that is to be sent to another endpoint device. For simplicity, the example method 700 will be discussed in terms of being performed by an endpoint device (e.g., any one of the two endpoint devices 501, 503).

At step 701, an endpoint device may receive, for a remote application or a remote desktop, data of a data type. This data may be received so that the endpoint device will send it to another endpoint device. The data may be any data discussed for the remote application 505 and/or the remote desktop 507 of FIG. 5. The data type may any of the types of data discussed above in connection with FIG. 5 (e.g., the real time data 532 of FIG. 5), any of the example classifications of Table I, and/or a combination thereof. The specific data received by the endpoint, and perhaps the specific data type received by the endpoint, may depend on whether the endpoint device is a user computing device or a server-side computing device. For example, if the endpoint device is a user computing device, the data received may be, or otherwise include, data indicating user interactions with the remote application or the remote desktop, such as mouse clicks, touch input, focus events, and the like. If the endpoint device is a server-side computing device, the received may be, or otherwise include, data indicating graphics or user interface elements for the remote application, remote desktop, or other remote service. The data received at step 601 may be any data that can be communicated according to a thin-client or remote-display protocol (e.g., ICA).

At step 703, the endpoint device may determine whether additional criteria has been configured for determining which connection will be used to send the data type of the data received at step 701. This determination may be performed in various ways including, for example, by being performed based on the data type of the data received at step 701, by being performed based on the connections that are established between the endpoint and another endpoint, and/or by being performed based on any account, preference, or other information associated with the remote application and/or the remote desktop. As more detailed examples, being performed based on the data type of the data received at step 701 may include determining whether additional criteria have been configured to be used for the data type (e.g., additional criteria may be configured for certain data types, like real time data). Being performed based on the connections that are established between the endpoint and another endpoint may include determining whether additional criteria has been configured to be used for any of the established connections (e.g., additional criterial may be configured for certain connections, like a connection that has a routing path that includes the gateway 509 of FIG. 5). Being performed based on any account, preference or other information associated with the remote application and/or remote desktop may include determining whether a user account associated with the remote application and/or remote desktop indicates additional criteria has been configured (e.g., determine whether the user account indicates that the user has signed up to pay for routing via the gateway 509 of FIG. 5); determining whether an operator of a cloud computing platform associated with at least one connection (e.g., a cloud computing platform accessed via gateway 509 of FIG. 5) has set a preference that indicates routing via the gateway 509 is prioritized or deprioritized.

Table II provides examples of additional criteria that may be configured for determining which connection will be used to send the data type of the data received at step 701. As indicated by the header row of Table II, the first column of Table II provides examples of additional criteria. The second column of Table I provides an example description of the example additional criteria. The examples provided by Table II are non-exhaustive, as many different types of additional criteria could be configured and used to determine which connection will be used to send the data type of the data received at step 701.

send the data type of the data received at step 701, the method 700 may proceed to step 705.

At step 705, the endpoint device may determine, based on connection condition data for a plurality of established connections associated with the remote application and/or the remote desktop, to send the data type via a particular connection from the plurality of established connections. The plurality of established connections may include connections that are established between the endpoint and another endpoint and for communicating data associated with the remote application and/or the remote desktop (e.g., the plural connections 515, 517, 519, 521 of FIG. 5). This determination may be based on one or more connection conditions of the connection condition data (e.g., connection condition data 527). The one or more connection conditions may have been determined and stored for this use based on performance of the example method 600 of FIG. 6. In this way, determining to send the data type via a particular connection may be performed based on latency, jitter, loss rates, bandwidth, MTU size, and the like.

Determining to send the data type via a particular connection may be performed based on one or more requirements of the data type. For example, if the data type requires low latency, any latency of the connection condition data may be compared to a threshold for the required low latency. The particular connection may be determined from any connection that satisfies the threshold for the required low latency. As another example, if the data type requires low latency, any latency of the connection condition data may be compared to other latencies of the connection condition

TABLE II

| Example Additional Criteria | Example Description |
|---|---|
| A cost associated with routing via a gateway that accesses a cloud computing platform | This example of additional criteria may be used to determine whether the data type of the data received at step 701 should be subject to a cost associated with routing via the gateway (e.g., gateway 509). Any costs may be billed to a user account associated with the remote application and/or remote desktop. Data types may or may not be subject to a cost associated with routing via a gateway. |
| A cost cap associated with routing via a gateway | This example of additional criteria may be used to determine whether a user account associated with the remote application and/or remote desktop has been billed equal to or in excess of a capped amount (e.g., the user account may specify a per month cost cap for routing data via the gateway). |
| A user status associated with routing via a gateway | This example of additional criteria may be used to determine whether a user account associated with the remote application and/or remote desktop indicates a user status such as the user having signed up to pay for routing via the gateway (e.g., the user may have to sign up for a billed subscription service to have data routed via the gateway and the user account may indicate this subscription status; the user may have to sign up for a billed subscription service to have connection assignments overridden by an endpoint device and the user account may indicate this subscription service). |
| A priority indicator associated with routing via a gateway | This example of additional criteria may be used to determine whether routing via the gateway should always be used if available (e.g., the gateway has high priority), be used only if all other connections do not meet the requirements of the data type (e.g., the gateway has low priority), and/or be used if no other connections that meet the requirements of the data type are higher in priority (e.g., the gateway has intermediate priority). |

If the endpoint device determines that additional criteria has been configured for determining which connection will be used to send the data type of the data received at step 701, the method 700 may proceed to step 707. If the endpoint device determines that no additional criteria has been configured for determining which connection will be used to data. In this way, the latencies for the established connections may be compared to each other to determine which of the established connection has the least latency and the particular connection may be determined to be the established connection with the least latency. Similar comparisons to thresholds and among conditions for the established connections may be performed for loss rates, MTU size, bandwidth, and the like. Further, more complex calculations may be performed to determine the particular connection, such as a calculation that scores or ranks the established connections based on the one or more requirements of the data type and one or more connection conditions of the connection condition data. In general, determining to send the data type via a particular connection may be performed based on any suitable technique that attempts to select the particular connection that best satisfies the one or more requirements of the data type.

At step 707, the endpoint device may determine, based on the connection condition data and the additional criteria, to send the data type via a particular connection from the plurality of established connections. This determination may be similar to the determination of step 705, except the endpoint device may use the additional criteria as a further basis for determining the particular connection. The additional criteria may include one or more of the examples of additional criteria discussed above in connection with FIG. 5, one or more of the examples of additional criteria of Table II, and/or a combination thereof. In this way, the additional criteria, such as whether the data type should be subject to a cost associated with routing via a gateway, may influence which connection is used to send the data type of the data received at step 701.

To provide an example of how the additional criteria may be used as a further basis for determining the particular connection, the following example uses additional criteria that is associated with a connection (e.g., connection one 515 of FIG. 5) that has a routing path that includes a gateway (e.g., gateway 509). The gateway may allow access to a cloud computing platform and a user account may be billed for any traffic routed via the gateway. In this example, the endpoint device may first determine whether the connection satisfies the one or more requirements of the data type (e.g., whether the connection that has a routing path that includes the gateway satisfies a threshold for the required low latency of the data type). If the one or more requirements are not satisfied, the endpoint device may not select the connection as the particular connection. If the one or more requirements are satisfied, the endpoint device may proceed to apply the additional criteria.

As a first application of the additional criteria, the endpoint device may determine whether the cost cap (an example of additional criteria in Table II) has been exceeded. If the cost cap has been exceeded, the endpoint device may not select the connection as the particular connection. If the cost cap has not been exceeded, the endpoint device may continue applying the additional criteria.

As a second application of the additional criteria, the endpoint device may determine whether to select the connection as the particular connection based on a user status (another example of additional criteria in Table II). If the user status indicates the user has signed up for a billed subscription service to have data routed via the gateway, the endpoint device may select the connection as the particular connection. If the user status the user has not signed up for the billed subscription service, the endpoint device may continue applying the additional criteria.

As a third application of the additional criteria, the endpoint device may determine whether any other connection has a higher priority than the connection based on a priority indicator (another example of additional criteria in Table II). If another connection (e.g., connection two 517 of FIG. 5) has a higher priority than the connection, the other connection may be selected as the particular connection. If no other connection has a higher priority than the connection, the connection may be selected as the particular connection.

Further, after applying the additional criteria, the endpoint device may make a final check to ensure the one or more requirements of the data type are satisfied. For example, if the other connection has a higher priority than the connection, the endpoint device may determine whether the other connection satisfies the one or more requirements of the data type. If the other connection satisfies the one or more requirements, the endpoint device may select the other connection as the particular connection. If the other connection does not satisfy the one or more requirements, the endpoint device may select the connection as the particular connection.

In some arrangements, the endpoint device may use the additional criteria only if more than one connection satisfies the one or more requirements of the data type. For example, if two connections satisfy the threshold for the required low latency of the data type, the endpoint device may use the additional criteria to select which of the two connections to use as the particular connection. As a more particular example, the additional criteria may include a priority indicator that indicates priority levels for the two connections that satisfy the threshold for the required low latency, and the endpoint device may select the connection with higher priority as the particular connection.

In some arrangements, the endpoint device may use the additional criteria only if a connection that satisfies the one or more requirements of the data type is different from pre-established connection assignments (e.g., connection assignments 523 of FIG. 5). For example, if the endpoint device stores a local copy of connection assignments, the endpoint device may compare a connection that satisfies the one or more requirements of the data type to the connection assignments to determine whether the connection differs from an assigned connection for the data type as indicated by the connection assignments. If the connection differs, the additional criteria may be used by the endpoint device to determine whether the connection should override the connection assignments. As a more particular example, the additional criteria may include a user status indicating that a user account associated with the remote application and/or the remote desktop has signed up for a subscription service that allows for the connection assignments to be overridden by the endpoint device. Based on this user status, the endpoint device may select the connection as the particular connection.

At step 709, the endpoint device may prepare the data of the data type for sending via the particular connection. This preparation may include formatting and otherwise processing the data such that it is formatted for the particular connection. This preparation, for example, may include generating one or more datagrams or one or more packets and including the data as payloads in the one or more datagrams or one or more packets. Additionally, this preparation may include determining and inserting routing information into the one or more datagrams or one or more packets. This routing information may be the same as, or similar to, the routing information 534 of FIG. 5. Accordingly, this routing information may cause an intermediary device to route the one or more datagrams or one or more packets along a routing path indicated by the routing information.

At step 711, the endpoint device may send the data type via the particular connection. Sending the data via the particular connection may include sending one or more datagrams and/or one or more packets. The one or more datagrams and/or one or more packets may include the routing information inserted at step 709.

Figure 8A:
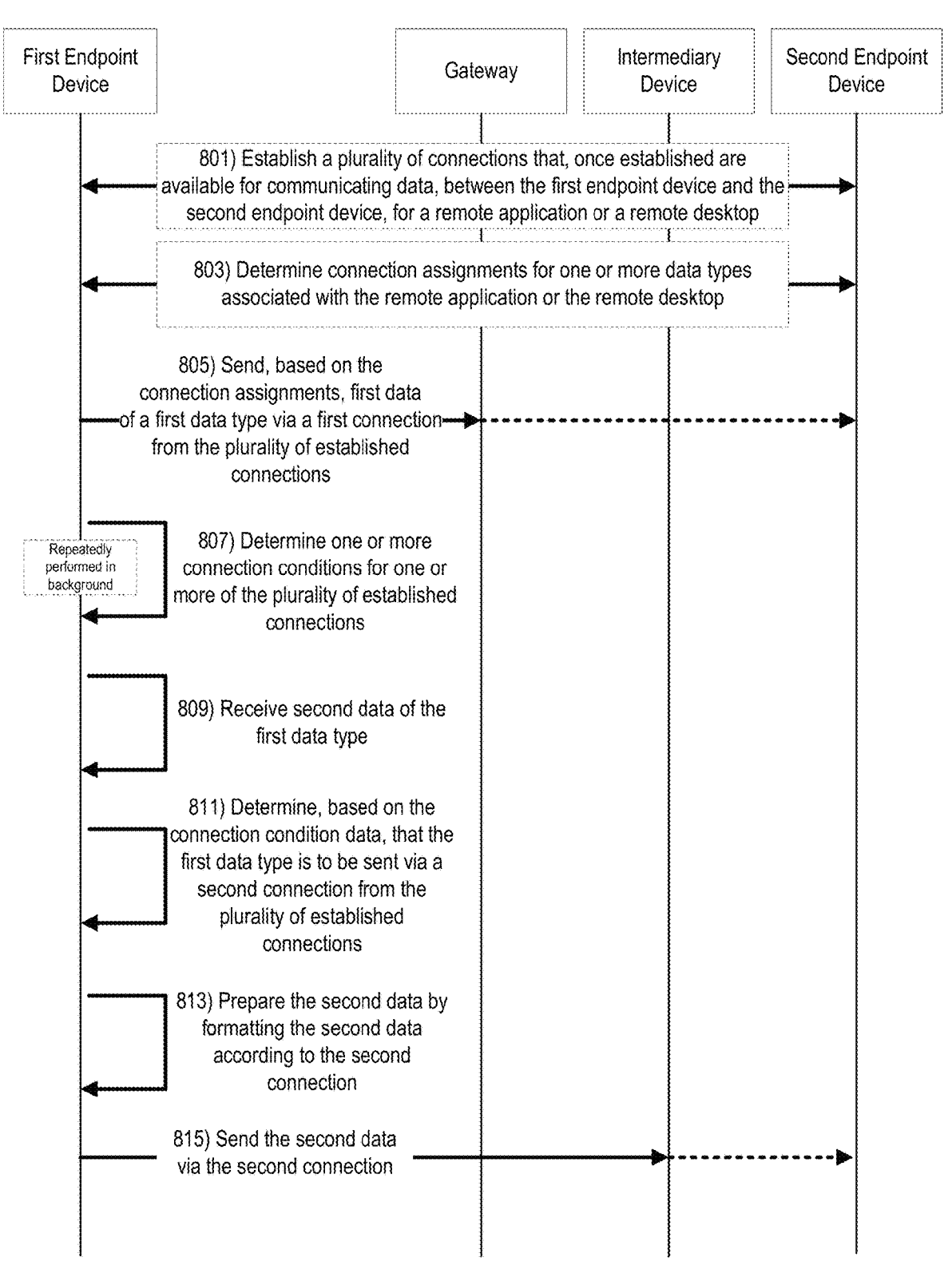
FIGS. 8A and 8B depict example method flows for performing one or more path selection processes that determine connection conditions and send data between endpoint devices via established, multi-path, connections.
Figure 8B:
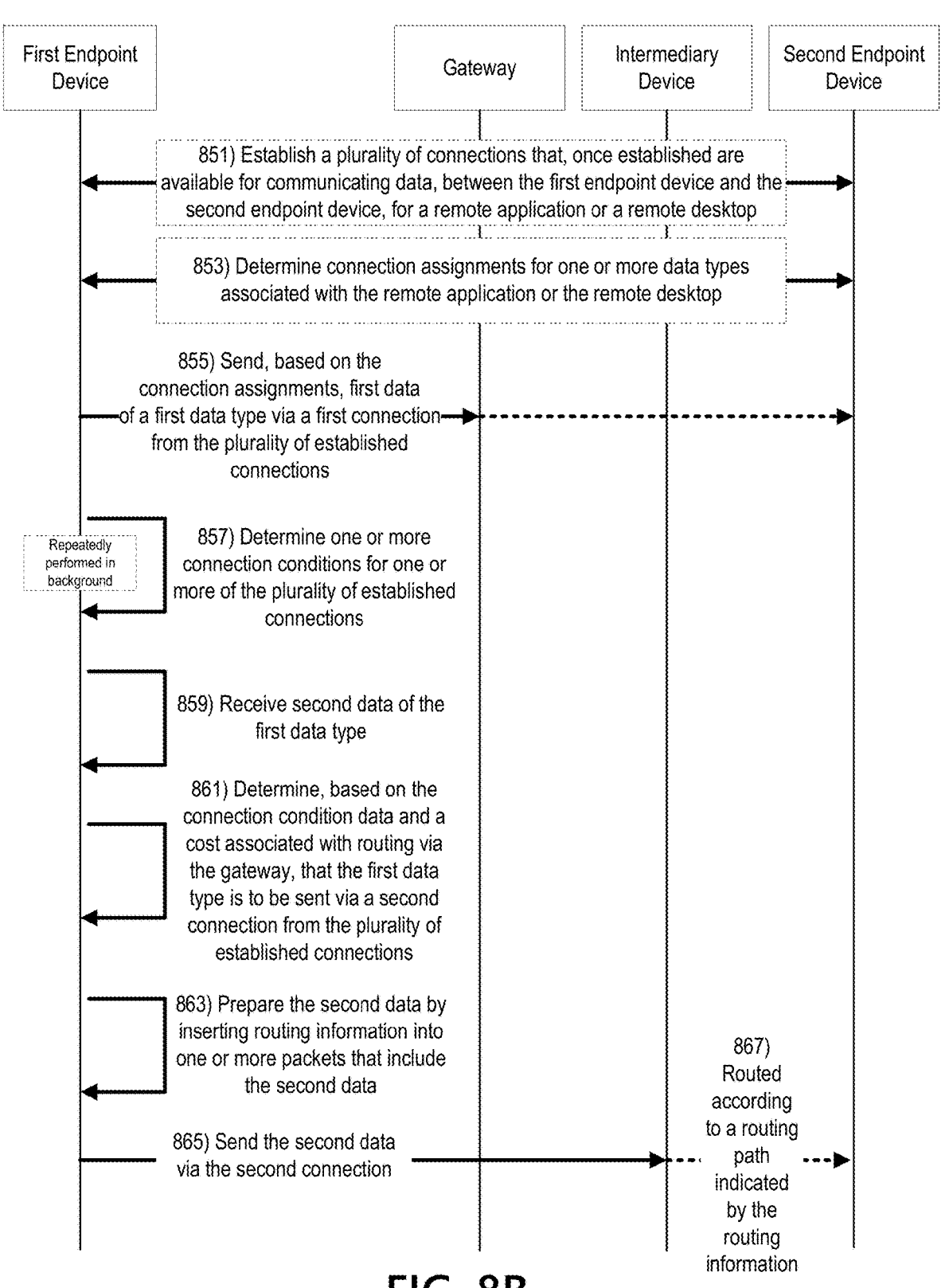

FIGS. 8A and 8B depict example method flows for performing one or more path selection processes that determine connection conditions and send data between endpoint devices via established, multi-path, connections. The example method flows may result from methods that are the same as, or similar to, the example methods 600 and 700 of FIGS. 6 and 7 being performed in a computing environment that is the same as, or similar to, the example remote computing environment 500 of FIG. 5. In particular, the example method flows depict examples in which a first endpoint device (e.g., the first endpoint device 501) performs path selection processes (e.g., path selection processes 530) that include performing the example methods 600 and 700. As a result of these path selection processes, the first endpoint device is shown in the example flows as sending data to a second endpoint device (e.g., the second endpoint device 503) in a way that differs from the connection assignments determined when connections between the two endpoints were established.

Beginning with the example flow of FIG. 8A, at item 801, a plurality of connections may be established (e.g., the plural connections 515, 517, 519, 521). Once established, the plurality of connections may be available for communicating data between the first endpoint device and the second endpoint device. The data may be for a remote application and/or a remote desktop (e.g., the remote application 505 and/or the remote desktop 507). The plurality of connections may be established the same as, or similar to, the manner described in connection with FIG. 5.

At item 803, connection assignments (e.g., connection assignments 523) may be determined for one or more data types (e.g., any data type based on the example classifications of Table I) associated with the remote application and/or the remote desktop. The connection assignments may be determined the same as, or similar to, the manner described in connection with FIG. 5.

Items 801 and 803 of FIG. 8A are shown in dashed lines because the establishment of the plurality of the connections and the determination of connection assignments may be performed prior to performance of the example methods 600 and 700. The example methods 600 and 700 may be performed as the first endpoint device performs the various steps shown at items 805-815.

At item 805, the first endpoint device may send, based on the connection assignments, first data of a first data type via a first connection from the plurality of established connections. The first data type may be any of the data types discussed above in connection with FIG. 5 or 7, shown above in the example classifications of Table I, or other similar data type. As depicted in FIG. 8A, the first connection (e.g., connection one 515) has a routing path that includes the gateway (e.g., gateway 509). In this way, FIG. 8A includes a dotted line at item 805 that travels from the gateway to the second endpoint device as a way to illustrate the routing path of the first connection.

Sending the first data based on the connection assignments may be performed in various ways. For example, the first data may be sent based on the connection assignments if no connection conditions have been determined by the first endpoint device and/or stored as part of the connection condition data (e.g., connection condition data 527, which may include one or more connection conditions based on a time window and/or based on recent activity). Moreover, the first endpoint device may be configured to send based on the connection assignments for a particular amount of time after the plurality of established connections were initially established. In this way, the first endpoint device may send the first data based on the connection assignments as a way to generate activity usable to determine one or more connection conditions based on that activity. Alternatively, sending based on the connection assignments may represent sending the first data in a way that does not differ from the connection assignments. In this way, the connection assignment for the first data may remain representative of the connection that best satisfies the one or more requirements of the first data type and the sending of the first data may have resulted based on performance of example method 700 or a similar method.

At item 807 (e.g., based on performing step 607 of FIG. 6), the first endpoint device may determine one or more connection conditions for one or more of the plurality of established connections. As depicted in FIG. 8A, this determination may be repeatedly performed (e.g., periodically) in the background or otherwise in parallel with the other processes performed in connection with the example flow of FIG. 8A. This determination may have resulted based on performance of method 600 or a similar method for each of the one or more of the plurality of established connections. Accordingly, as discussed above in connection with the method 600, the first endpoint device, based on repeatedly performing the method 600 for each one or more of the plurality of established connections, may be repeatedly determining an estimation of current network conditions (e.g., based on repeatedly determining one or more connection conditions for each of the one or more of the plurality of established connections) and/or may be repeatedly generating activity on each of the one or more of the plurality of established connections (based on repeatedly sending duplicative data via each of the one or more of the plurality of established connections).

The remaining items 809-815 may result based on performance of the method 700 or a similar method. At item 809 (e.g., based on performing step 701 of method 700), the first endpoint device may receive second data of the first data type (e.g., the same data type as the first data of item 805).

At item 811 (e.g., based on performing step 705 of method 700), the first endpoint device may determine, based on connection condition data, that the first data type is to be sent via a second connection (e.g., connection four 521) from the plurality of established connections. In this way, the first endpoint device may determine to send the first data type via a connection (e.g., connection four 521) that differs from the connection assignments (e.g., connection one 515).

At item 813 (e.g., based on performing step 709 of method 700), the first endpoint device may prepare the second data by formatting the data according to the second connection. In this way, the second data may be formatted, or otherwise prepared, for sending via the connection (e.g., one or more datagrams or one or more packets may include the second data as a payload).

At item 815 (e.g., based on performing step 711 of method 700), the first endpoint device may send the second data via the second connection. In this way, the first endpoint device may send the second data via a connection (e.g., connection four 521) that differs from the connection assignments (e.g., connection one 515). As depicted in FIG. 8A, the second connection (e.g., connection four 521) has a routing path that includes the intermediary device (e.g., intermediary device 511-2). In this way, FIG. 8A includes a dotted line at item 815 that travels from the intermediary device to the second endpoint device as a way to illustrate the routing path of the second connection.

While FIG. 8A depicts first data and second data as being of a first data type and being sent by the first endpoint device, the depicted example may be part of an overall process for a remote application and/or a remote desktop (e.g., the remote application 505 and/or the remote desktop 507 of FIG. 5) where the first endpoint device sends and/or receives various data types to and/or from the second endpoint device via the plurality of connections. In this way, the first endpoint device may send and/or receive data of the data types based on the connection assignments, and may send and/or receive data of the data types based on connection conditions determined by the first endpoint device and/or the second endpoint device. For example, if the first data type is real time data, a second data type may be non-real time data. The connection assignments may assign the non-real time data to one of the plurality of connections. The first endpoint device may send, based on the connection assignments, any received non-real time data via the one of the plurality of connections. Based on connection conditions determined by the first endpoint device, the first endpoint device may continue to send any received non-real time data via the one of the plurality of connections, and/or may change from the connection assignments and send any received non-real time data via another connection of the plurality of connections (e.g., the first connection, the second connection, or a third connection of the plurality of connections).

Continuing with the example flow of FIG. 8B, items 851-859 of FIG. 8B proceed the same as, or similar to items 801-809 of FIG. 8B. at item 851. At item 851 a plurality of connections may be established (e.g., the plural connections 515, 517, 519, 521). Once established, the plurality of connections may be available for communicating data between the first endpoint device and the second endpoint device. The data may be for a remote application and/or a remote desktop (e.g., the remote application 505 and/or the remote desktop 507). The plurality of connections may be established the same as, or similar to, the manner described in connection with FIG. 5.

At item 853, connection assignments (e.g., connection assignments 523) may be determined for one or more data types (e.g., any data type based on the example classifications of Table I) associated with the remote application and/or the remote desktop. The connection assignments may be determined the same as, or similar to, the manner described in connection with FIG. 5.

Items 851 and 853 of FIG. 8B are shown in dashed lines because the establishment of the plurality of the connections and the determination of connection assignments may be performed prior to performance of the example methods 600 and 700. The example methods 600 and 700 may be performed as the first endpoint device performs the various steps shown at items 855-865.

At item 855, the first endpoint device may send, based on the connection assignments, first data of a first data type via a first connection from the plurality of established connections. The first data type may be any of the data types discussed above in connection with FIG. 5 or 7, shown above in the example classifications of Table I, or other similar data type. As depicted in FIG. 8B, the first connection (e.g., connection one 515) has a routing path that includes the gateway (e.g., gateway 509). In this way, FIG. 8B includes a dotted line at item 855 that travels from the gateway to the second endpoint device as a way to illustrate the routing path of the first connection.

Sending the first data based on the connection assignments may be performed in various ways. For example, the first data may be sent based on the connection assignments if no connection conditions have been determined by the first endpoint device and/or stored as part of the connection condition data (e.g., connection condition data 527, which may include one or more connection conditions based on a time window and/or based on recent activity). Moreover, the first endpoint device may be configured to send based on the connection assignments for a particular amount of time after the plurality of established connections were initially established. In this way, the first endpoint device may send the first data based on the connection assignments as a way to generate activity usable to determine one or more connection conditions based on that activity. Alternatively, sending based on the connection assignments may represent sending the first data in a way that does not differ from the connection assignments. In this way, the connection assignment for the first data may remain representative of the connection that best satisfies the one or more requirements of the first data type and the sending of the first data may have resulted based on performance of example method 700 or a similar method.

At item 857 (e.g., based on performing step 607 of FIG. 6), the first endpoint device may determine one or more connection conditions for one or more of the plurality of established connections. As depicted in FIG. 8B, this determination may be repeatedly performed (e.g., periodically) in the background or otherwise in parallel with the other processes performed in connection with the example flow of FIG. 8B. This determination may have resulted based on performance of method 600 or a similar method for each of the one or more of the plurality of established connections. Accordingly, as discussed above in connection with the method 600, the first endpoint device, based on repeatedly performing the method 600 for each one or more of the plurality of established connections, may be repeatedly determining an estimation of current network conditions (e.g., based on repeatedly determining one or more connection conditions for each of the one or more of the plurality of established connections) and/or may be repeatedly generating activity on each of the one or more of the plurality of established connections (based on repeatedly sending duplicative data via each of the one or more of the plurality of established connections).

The remaining items 859-865 may result based on performance of the method 700 or a similar method. At item 859 (e.g., based on performing step 701 of method 700), the first endpoint device may receive second data of the first data type (e.g., the same data type as the first data of item 805).

At item 861 (e.g., based on performing step 707 of method 700), the first endpoint device may determine, based on connection condition data and a cost associated with routing via the gateway, that the first data type is to be sent via a second connection (e.g., connection four 521) from the plurality of established connections. In this way, the first endpoint device may determine to send the first data type via a connection (e.g., connection four 521) that differs from the connection assignments (e.g., connection one 515). The cost associated with routing via the gateway may be one of the additional criteria applied by the first endpoint device as part of this determination (e.g., the additional criteria of the cost may applied by the first endpoint device because the first connection has a routing path that includes the gateway).

The additional criteria applied by the first endpoint device as part of this determination may also include additional examples shown in Table II.

At item 863 (e.g., based on performing step 709 of method 700), the first endpoint device may prepare the second data by inserting routing information into one or more packets that include the second data as payloads. The routing information may be the same as, or similar to, the routing information 534 of FIG. 5 (e.g., a DSCP value, a VLAN identifier, a custom value, and/or a custom data field).

At item 865 (e.g., based on performing step 711 of method 700), the first endpoint device may send the second data via the second connection. In this way, the first endpoint device may send the second data via a connection (e.g., connection four 521) that differs from the connection assignments (e.g., connection one 515). As depicted in FIG. 8B, the second connection (e.g., connection four 521) has a routing path that includes the intermediary device (e.g., intermediary device 511-2). The intermediary device may be configured to route based on the routing information (e.g., include configuration that is the same as or similar to configuration 536 of FIG. 5). In this way, FIG. 8B includes item 867 that depicts a dotted line that travels from the intermediary device to the second endpoint device as a way to illustrate the routing path of the second connection and to indicate the intermediary device processed the routing information and was caused to route according to a routing path indicated by the routing information.

The above example flows of FIGS. 8A and 8B show only a few examples of the method flows that may result based on performance of the methods 600 and 700 of FIGS. 6 and 7 in the example remote computing environment 500. Many additional examples, and variations, to the example flows of FIGS. 8A and 8B may result from the many examples discussed in connection with FIGS. 5, 6, 7, and the examples of Table I and II. For example, one variation may include determining one or more connection conditions based on duplicate data sent from the first endpoint device. Another variation may be where the first endpoint device prepares the second data by inserting routing information (e.g., the same as, or similar to, at item 863) and the intermediary device of the example flow of FIG. 8A is configured to process routing information. In this variation, the intermediary device of the example flor of FIG. 8A may route the second data according to a routing path indicated by the routing information (e.g., the same as, or similar to, item 867).

While FIG. 8B depicts first data and second data as being of a first data type and being sent by the first endpoint device, the depicted example may be part of an overall process for a remote application and/or a remote desktop (e.g., the remote application 505 and/or the remote desktop 507 of FIG. 5) where the first endpoint device sends and/or receives various data types to and/or from the second endpoint device via the plurality of connections. In this way, the first endpoint device may send and/or receive data of the data types based on the connection assignments, and may send and/or receive data of the data types based on connection conditions determined by the first endpoint device and/or the second endpoint device. For example, if the first data type is real time data, a second data type may be bulk data. The connection assignments may assign the bulk data to one of the plurality of connections. The first endpoint device may send, based on the connection assignments, any received bulk data via the one of the plurality of connections. Based on connection conditions determined by the first endpoint device, the first endpoint device may continue to send any received bulk data via the one of the plurality of connections, and/or may change from the connection assignments and send any received bulk data via another connection of the plurality of connections (e.g., the first connection, the second connection, or a third connection of the plurality of connections).

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
based on a connection assignment that indicates a first data type is to be sent via a first connection from a plurality of established connections between a first endpoint device and a second endpoint device, sending, by the first endpoint device to the second endpoint device, first data of the first data type via the first connection, wherein each of the plurality of established connections is available to communicate data, between the first endpoint and the second endpoint, for a remote application or a remote desktop, wherein the first data type is associated with the remote application or the remote desktop, and wherein the first data is for the remote application or the remote desktop;
determining, by the first endpoint device and for the plurality of established connections, a connection condition for the at least one of the plurality of established connections by:
transmitting duplicative data over the at least one of the plurality of established connections when the at least one of the plurality of established connections is idle, wherein the duplicative data comprises data previously sent from the first endpoint device; and
collecting performance data related to the transmission of the duplicative data;
determining, by the first endpoint device and based on the connection condition, that the first data type is to be sent via a second connection from the plurality of established connections; and
based on determining that the first data type is to be sent via the second connection, sending, by the first endpoint device and to the second endpoint device, second data of the first data type via the second connection, wherein the second data is associated with the remote application or the remote desktop.

2. The method of claim 1, wherein sending the second data is performed by sending one or more packets that include the second data, and wherein the method further comprises:
prior to sending the one or more packets, inserting routing information into the one or more packets, wherein the routing information indicates a routing path to intermediary devices that receive the one or more packets as the one or more packets are routed to the second endpoint device.

3. The method of claim 2, wherein the routing information includes a custom value and/or a custom data field, and wherein at least one the intermediary devices is configured to route based on custom value and/or the custom data field and cause the one or more packets to be routed according to the routing path.

4. The method of claim 1, wherein determining the connection condition is based on third data being sent between the first endpoint device and the second endpoint device via the at least one of the plurality of established connections, and wherein the third data is a duplicate of other data previously sent between the first endpoint device and the second endpoint device.

5. The method of claim 1, wherein determining that the first data type is to be sent via the second connection is performed based on a cost associated with routing via a gateway.

6. The method of claim 1, wherein determining the connection condition is part of a process that repeatedly generates activity on the connection by sending duplicative data via the connection and that repeatedly determines an estimation of current network conditions for the connection.

7. The method of claim 6, wherein the plurality of established connections is associated with a plurality of network interfaces configured for the first endpoint device, and wherein the plurality of network interfaces includes a wireless network interface and a Long Term Evolution (LTE) interface.

8. The method of claim 1, wherein the first data type is for real-time data associated with the remote application or the remote desktop, wherein the connection assignment indicates non-real time data associated with the remote application or the remote desktop is to be sent via one of the plurality of established connections that is different from the first connection, and wherein the method further comprises sending, by the first endpoint device and to the second endpoint device, first non-real time data via the one of the plurality of established connections.

9. The method of claim 1, wherein the first connection establishes a first routing path that includes a gateway, and wherein the second connection establishes a second routing path that bypasses the gateway.

10. The method of claim 1, wherein the connection condition indicates latency, jitter, bandwidth, loss rate, or a maximum transmission unit (MTU) size.

11. One or more non-transitory computer-readable media storing executable instructions that, when executed by one or more processors of a first endpoint device, cause the first endpoint device to:

based on a connection assignment that indicates a first data type is to be sent via a first connection from a plurality of established connections between the first endpoint device and a second endpoint device, send, to the second endpoint device, first data of the first data type via the first connection, wherein each of the plurality of established connections is available to communicate data, between the first endpoint and the second endpoint, for a remote application or a remote desktop, wherein the first data type is associated with the remote application or the remote desktop, and wherein the first data is for the remote application or the remote desktop;

determine, for the plurality of established connections, a connection condition for the at least one of the plurality of established connections by:

transmitting duplicative data over the at least one of the plurality of established connections when the at least one of the plurality of established connections is idle, wherein the duplicative data comprises data previously sent from the first endpoint device; and collecting performance data related to the transmission of the duplicative data;

determine, based on the connection condition, that the first data type is to be sent via a second connection from the plurality of established connections; and based on determining that the first data type is to be sent via the second connection, send, to the second endpoint device, second data of the first data type via the second connection, wherein the second data is associated with the remote application or the remote desktop.

12. The one or more non-transitory computer readable media of claim 11, wherein the executable instructions, when executed by the one or more processors, cause the first endpoint device to send the second data by sending one or more packets that include the second data; and wherein the executable instructions, when executed by the one or more processors, cause the first endpoint device to:

prior to sending the one or more packets, insert routing information into the one or more packets, wherein the routing information indicates a routing path to intermediary devices that receive the one or more packets as the one or more packets are routed to the second endpoint device.

13. The one or more non-transitory computer readable media of claim 12, wherein the routing information includes a custom value and/or a custom data field, and wherein at least one the intermediary devices is configured to route based on custom value and/or the custom data field and cause the one or more packets to be routed according to the routing path.

14. The one or more non-transitory computer readable media of claim 11, wherein the executable instructions, when executed by the one or more processors, cause the first endpoint device to determine the connection condition based on third data being sent between the first endpoint device and the second endpoint device via the at least one of the plurality of established connections, and wherein the third data is a duplicate of other data previously sent between the first endpoint device and the second endpoint device.

15. The one or more non-transitory computer readable media of claim 11, wherein the executable instructions, when executed by the one or more processors, cause the first endpoint device to determine that the first data type is to be sent via the second connection is performed based on a cost associated with routing via a gateway.

16. A first endpoint device comprising:

one or more processors; and memory storing executable instructions that, when executed by the one or more processors, cause the first endpoint device to:

based on a connection assignment that indicates a first data type is to be sent via a first connection from a plurality of established connections between the first endpoint device and a second endpoint device, send, to the second endpoint device, first data of the first data type via the first connection, wherein each of the plurality of established connections is available to communicate data, between the first endpoint and the second endpoint, for a remote application or a remote desktop, wherein the first data type is associated with the remote application or the remote desktop, and wherein the first data is for the remote application or the remote desktop;

determine, for the plurality of established connections, a connection condition for the at least one of the plurality of established connections by:

transmitting duplicative data over the at least one of the plurality of established connections when the at least one of the plurality of established connections is idle, wherein the duplicative data comprises data previously sent from the first endpoint device; and collecting performance data related to the transmission of the duplicative data;

determine, based on the connection condition, that the first data type is to be sent via a second connection from the plurality of established connections; and based on determining that the first data type is to be sent via the second connection, send, to the second endpoint device, second data of the first data type via the second connection, wherein the second data is associated with the remote application or the remote desktop.

17. The first endpoint device of claim 16, wherein the executable instructions, when executed by the one or more processors, cause the first endpoint device to send the second data by sending one or more packets that include the second data; and wherein the executable instructions, when executed by the one or more processors, cause the first endpoint device to:

prior to sending the one or more packets, insert routing information into the one or more packets, wherein the routing information indicates a routing path to intermediary devices that receive the one or more packets as the one or more packets are routed to the second endpoint device.

18. The one or more non-transitory computer readable media of claim 17, wherein the routing information includes a custom value and/or a custom data field, and wherein at least one the intermediary devices is configured to route based on custom value and/or the custom data field and cause the one or more packets to be routed according to the routing path.

19. The first endpoint device of claim 16, wherein the executable instructions, when executed by the one or more processors, cause the first endpoint device to determine the connection condition based on third data being sent between the first endpoint device and the second endpoint device via the at least one of the plurality of established connections, and wherein the third data is a duplicate of other data previously sent between the first endpoint device and the second endpoint device.

20. The first endpoint device of claim 16, wherein the executable instructions, when executed by the one or more processors, cause the first endpoint device to determine that the first data type is to be sent via the second connection is performed based on a cost associated with routing via a gateway.

* * * * *